US 11,467,055 B2

(12) United States Patent
Tos et al.

(10) Patent No.: US 11,467,055 B2
(45) Date of Patent: Oct. 11, 2022

(54) LEAK DETECTION DEVICE

(71) Applicant: GAZTRANSPORT ET TECHNIGAZ, Saint Remy les Chevreuse (FR)

(72) Inventors: Gael Tos, Saint Remy les Chevreuse (FR); Sebastien Larroque, Saint Remy les Chevreuse (FR); Carlos Da Cunha, Saint Remy les Chevreuse (FR); David Hassler, Saint Remy les Chevreuse (FR); Olivier Perrot, Saint Remy les Chevreuse (FR); Anthony De Faria, Saint Remy les Chevreuse (FR); Vincent Fraysse, Saint Remy les Chevreuse (FR); Charles Gimbert, Saint Remy les Chevreuse (FR); Bruno Deletre, Saint Remy les Chevreuse (FR)

(73) Assignee: GAZTRANSPORT ET TECHNIGAZ, Saint Remy les Chevreuse (FR)

( * ) Notice: Subject to any disclaimer, the term of this patent is extended or adjusted under 35 U.S.C. 154(b) by 0 days.

(21) Appl. No.: 17/056,697

(22) PCT Filed: May 21, 2019

(86) PCT No.: PCT/FR2019/051157
§ 371 (c)(1),
(2) Date: Nov. 18, 2020

(87) PCT Pub. No.: WO2019/224475
PCT Pub. Date: Nov. 28, 2019

(65) Prior Publication Data
US 2021/0364381 A1    Nov. 25, 2021

(30) Foreign Application Priority Data

May 22, 2018 (FR) ........................................ 1870586
Mar. 19, 2019 (WO) .................. PCT/FR2019/050623

(51) Int. Cl.
*G01M 3/20* (2006.01)
*G01M 3/22* (2006.01)

(52) U.S. Cl.
CPC ............ *G01M 3/205* (2013.01); *G01M 3/225* (2013.01); *G01M 3/226* (2013.01)

(58) Field of Classification Search
CPC .................................................... G01M 3/325
See application file for complete search history.

(56) References Cited

U.S. PATENT DOCUMENTS 2,660,053 A * 11/1953 Buehner ................ G01M 3/088
73/40
3,627,369 A * 12/1971 Nixon .................... B66C 1/0212
294/189

(Continued)

FOREIGN PATENT DOCUMENTS

CH         215694 A    10/1941
EP       3208591 A1    8/2017

(Continued)

OTHER PUBLICATIONS

International Search Report for corresponding PCT application No. PCT/FR2019/051157, dated Dec. 18, 2019.

*Primary Examiner* — Paul M. West
*Assistant Examiner* — Mark A Shabman
(74) *Attorney, Agent, or Firm* — Notaro, Michalos & Zaccaria P.C.

(57) ABSTRACT

Leak detection device having a dome with a main body and a seal configured to define a detection chamber between the main body and the test zone, the seal including a peripheral sealing lip configured to come into contact with the sealing membrane and having a closed contour encircling the detection chamber, an analysis tool connected to the detection chamber to analyze a gas present in the detection chamber in which the sealing lip is configured to have at least in a (Continued)

service state in which a reduced pressure is applied in the detection chamber, a pinch portion that is pinched between the main body and the sealing membrane.

21 Claims, 12 Drawing Sheets

(56) References Cited

U.S. PATENT DOCUMENTS

| | | | | |
|---|---|---|---|---|
| 3,910,620 | A * | 10/1975 | Sperry | B66C 1/0243 |
| | | | | 294/189 |
| 3,949,596 | A * | 4/1976 | Hawk | G01M 3/223 |
| | | | | 73/40.7 |
| 4,002,055 | A * | 1/1977 | Kops | G01M 3/145 |
| | | | | 73/40 |
| 4,406,855 | A * | 9/1983 | Schwiers | G21C 17/002 |
| | | | | 376/250 |
| 4,979,390 | A * | 12/1990 | Schupack | G01M 3/04 |
| | | | | 73/38 |
| 5,834,772 | A * | 11/1998 | Baumgardner | H01J 49/0427 |
| | | | | 250/288 |
| 6,425,565 | B1 * | 7/2002 | Montague | F16B 47/00 |
| | | | | 248/205.9 |
| 6,463,791 | B1 * | 10/2002 | Berube | G01M 3/2884 |
| | | | | 73/46 |
| 6,823,719 | B2 * | 11/2004 | Poblete | G01M 3/32 |
| | | | | 73/37 |
| 7,775,490 | B2 * | 8/2010 | Kawabata | F16B 47/00 |
| | | | | 248/205.5 |
| 9,128,002 | B2 * | 9/2015 | Marino | G01M 3/226 |

FOREIGN PATENT DOCUMENTS

| | | |
|---|---|---|
| FR | 2434686 A1 | 3/1980 |
| FR | 2943784 A1 | 10/2010 |
| JP | S57 37240 A | 3/1982 |
| JP | 2016223849 A | 12/2016 |
| JP | 2017227530 A | 12/2017 |
| KR | 1020100050128 | 12/2011 |
| TW | 527487 B | 4/2003 |

* cited by examiner

LEAK DETECTION DEVICE

TECHNICAL FIELD

The invention relates to a leak detection dome enabling detection of leaks from a sealing membrane, in particular from a corrugated sealing membrane, for example in a sealed tank. Those sealed tanks may for example be sealed and thermally insulating tanks for storing and/or transporting a fluid, such as a cryogenic fluid.

TECHNOLOGICAL BACKGROUND

The document KR1020100050128 discloses a method of testing the seal of a membrane of a sealed and thermally insulating tank for storing LNG. The tank has a multilayer structure and features successively, from the exterior toward the interior, a secondary insulating space, a secondary sealing membrane, a primary insulating space and a primary sealing membrane intended to be in contact with the liquefied natural gas contained in the tank. The method aims more particularly to detect leaks through weld beads enabling sealed connection of the metal plates of the primary sealing membrane. The method provides for injecting a tracer gas into the primary insulating space and then moving a detection tool equipped with a tracer gas analyzer, inside the tank, along the weld beads of the primary sealing membrane. Thus if the detection tool detects the presence of the tracer gas it may be concluded that there is a defect in the seal of the primary sealing membrane. In this kind of method the injection of the tracer gas into the primary insulating space is critical because the detection method is not able to guarantee reliable results unless the tracer gas has diffused in an homogeneous manner into the entirety of the primary insulating space.

Moreover, the detection tool consists of a tracer gas suction unit and a tracer gas detector. The suction unit is moved by means of a carriage all along the weld bead, the carriage being situated on a bottom wall of the tank and the suction unit being fixed to the carriage in such a manner as to be located over a weld bead of a wall adjacent the bottom wall. However, it is difficult using this tool to verify the integrity of the weld beads of the tank because the tool is bulky and needs to be connected to the carriage on the bottom wall. This tool is also very slow because the tool verifies only a small portion of the weld bead at a time and it is necessary to modify the assembly of the tool to the carriage to change weld bead.

SUMMARY OF THE INVENTION

One idea on which the invention is based is to propose a detection dome or a leak detection device enabling testing of the seal of a sealed membrane of a tank that is reliable and easily usable in the tank.

Another idea on which the invention is based is to propose a detection dome or a leak detection device that can be used quickly, enabling testing of the seal of a sealed membrane of a tank in minimum time.

Another idea on which the invention is based is to propose a method of testing the seal of a membrane that is reliable and quick to use.

Some aspects of the invention relate to a leak detection dome, in particular for detecting a leak in a test zone of a sealing membrane of a sealed and thermally insulating tank, the dome including a main body intended to be disposed on a test zone and a seal connected to the main body and configured to define a detection chamber between the main body and the test zone, the seal including a peripheral lip seal configured to come into contact with the sealing membrane and having a closed contour encircling the detection chamber.

Some aspects of the invention relate to a leak detection device including:
a detection dome as referred to above,
a vacuum pump connected to the detection chamber to generate a reduced pressure in the detection chamber, and
an analysis tool connected to the detection chamber to analyze a gas present in the detection chamber.

Some aspects of the invention relate to a method of using this kind of leak detection device or this kind of leak detection dome to detect a leak in a test zone of a sealing membrane of a sealed and thermally insulating tank.

To this end, in accordance with a first object, the invention provides a leak detection device for detecting a leak in a test zone of a sealing membrane of a sealed and thermally insulating tank, the leak detection device including:
a leak detection dome including a main body intended to be disposed in the test zone and a seal connected to the main body and configured to define a detection chamber between the main body and the test zone, the seal including a peripheral sealing lip configured to come into contact with the sealing membrane and having a closed contour encircling the detection chamber,
a vacuum pump connected to the detection chamber to generate a reduced pressure in the detection chamber, and
an analysis tool connected to the detection chamber to analyze a gas present in the detection chamber,
in which the sealing lip is configured to have, at least in a service state in which a reduced pressure is applied in the detection chamber, a pinch portion that is pinched between the main body and the sealing membrane over at least a part of the periphery of the detection chamber over all of the periphery of the detection chamber.

In accordance with one embodiment, the sealing lip has a flexibility enabling the formation of said pinch portion by deformation of the sealing lip in the direction of the detection chamber because of the effect of the reduced pressure in the detection chamber.

In accordance with one embodiment, the sealing lip has said pinch portion also in a rest state, the pinch portion being disposed in such a manner as to cover all or part of a lower surface of the main body intended to face toward the sealing membrane.

In accordance with one embodiment, the detection chamber of the leak detection dome has a convex, for example circular or polygonal, zone intended to cover a junction zone between four corrugated or plane metal plates.

In accordance with one embodiment, a circle geometrically inscribed in the convex zone has a diameter greater than 68 mm.

In accordance with one embodiment, the detection dome has an elongate shape along a longitudinal axis, the detection chamber of the leak detection dome including an elongate zone intended to cover a rectilinear edge of a metal plate, the convex zone being disposed at one end of the elongate zone.

In accordance with one embodiment, the convex zone is a first convex zone and the detection chamber of the leak detection dome includes a second convex zone disposed at an end of the elongate zone opposite the first convex zone along the longitudinal axis.

In accordance with one embodiment, the detection dome has an elongate shape along a longitudinal axis, the convex zone constituting a central portion of the detection chamber of the leak detection dome, the detection chamber including two elongate zones extending from the convex zone away from one another along the longitudinal axis.

In accordance with one embodiment, the detection chamber has a convex polygonal or circular shape.

In accordance with one embodiment, a circle geometrically inscribed in the shape of the detection chamber has a diameter greater than 68 mm.

The invention also provides a method of using the aforementioned leak detection device in a test zone including a junction zone between four corrugated or plane metal plates of a tank sealing membrane, the method including the steps of:
- placing the leak detection dome in the test zone in such a manner that the sealing lip comes into contact with the sealing membrane all around the test zone and the convex zone covers said junction zone,
- generating a reduced pressure in the detection chamber by means of the vacuum pump,
- pinching the pinch portion of the sealing lip between the main body and the sealing membrane over at least a part of the periphery of the detection chamber,
- conveying the gases present in the detection chamber toward the analysis tool, and
- analyzing by means of the analysis tool the gases coming from the detection chamber to produce a measurement signal representing a quantity of at least one gas present in the detection chamber.

In accordance with a second object, the invention provides a leak detection dome for detecting a leak in a test zone of a sealing membrane of a tank, the detection dome including a main body intended to be disposed in the test zone and a seal connected to the main body and configured to define a detection chamber between the main body and the test zone, the seal including a peripheral sealing lip configured to come into contact with the sealing membrane and having a closed contour encircling the detection chamber, in which the detection dome has an elongate shape in a longitudinal direction and further includes at least one sighting device attached to one longitudinal end of the detection dome, the sighting device including an indicator element aligned with a median longitudinal axis of the detection chamber to indicate visually the position of said median longitudinal axis of the detection chamber to an operative.

In accordance with one embodiment, the indicator element includes a pointed or arrow-shaped body oriented in line with the median longitudinal axis of the detection chamber.

In accordance with one embodiment, the sighting device includes a light source, the indicator element including a directional light beam oriented in line with the median longitudinal axis of the detection chamber.

In accordance with one embodiment, the light source is a laser source, for example a laser diode.

In accordance with one embodiment the detection dome includes two sighting devices attached to two opposite longitudinal ends of the detection dome and each including an indicator element aligned with the median longitudinal axis of the detection chamber to indicate visually the position of said median longitudinal axis of the detection chamber to an operative.

In accordance with one embodiment, the detection dome further includes at least one handling handle disposed on an upper surface of the detection dome facing away from the sealing lip.

In accordance with one embodiment, the detection dome includes two handling handles disposed on the upper surface in the vicinity of the two longitudinal ends of the detection dome.

The invention also provides a method of using a detection dome as referred to above on a sealing membrane including a plurality of globally rectangular metal plates that are welded to one another, in which the test zone includes a rectilinear edge of one of said metal plates, the method including the step of placing the detection dome on the sealing membrane and aligning the indicator element of the or each sighting device with said rectilinear edge.

The metal plates are advantageously welded to one another with an overlap, the rectilinear edge of the metal plate being offset in a direction of thickness of the sealing membrane relative to an adjacent metal plate and being disposed so as to overlap the adjacent metal plate.

In accordance with a third object, the invention provides a leak detection device for detecting a leak in a test zone of a sealing membrane of a sealed and thermally insulating tank, the leak detection device including:
- a portable leak detection dome, the detection dome including a main body intended to be disposed in the test zone and a seal connected to the main body and configured to define a detection chamber between the main body and the test zone, the seal including a peripheral sealing lip configured to come into contact with the sealing membrane and having a closed contour encircling the detection chamber, the detection dome further including a handling handle provided with a manually actuatable control member for producing a control signal,
- a gas aspiration circuit intended to connect the detection chamber to a vacuum pump, the gas aspiration circuit being provided with a controlled valve switchable into an open state to connect the detection chamber to the vacuum pump and a closed state to isolate the detection chamber from the vacuum pump, and
- a control unit configured to switch the control valve in response to the control signal.

In accordance with one embodiment, the control unit is configured to switch the controlled valve alternately between the open state and the closed state in response to the control signal.

In accordance with one embodiment, the control member is a first manually actuatable control member for producing a first control signal and the detection dome further includes a second manually actuatable control member for producing a second control signal,
the control unit being configured to switch the control valve into the open state in response to the first control signal and into the closed state in response to the second control signal.

In accordance with one embodiment, the handling handle is a first handling handle and the detection dome further includes a second handling handle that is provided with the second control unit.

In accordance with one embodiment, the or each handling handle is disposed on an upper surface of the detection dome facing away from the sealing lip.

In accordance with one embodiment, the control valve is carried by the detection dome.

In accordance with one embodiment, the device further includes an analysis tool connected to the detection chamber by the gas aspiration circuit and a pressure sensor adapted to supply to the control unit a measurement signal representative of a pressure in the detection chamber and the control unit is configured to determine that the pressure in the detection chamber is below a predefined pressure threshold and to respond by activating the analysis tool.

In accordance with one embodiment, the pressure sensor is arranged on the detection dome and is in fluidic communication with the detection chamber.

In accordance with one embodiment, the analysis tool includes a mass spectrometer.

In accordance with one embodiment, the gas aspiration circuit includes a hose connected to a gas outlet of the detection dome.

In accordance with one embodiment, the gas aspiration circuit further includes a three-port connector the ports of which are respectively connected to the hose, to a vacuum pump and to an analysis tool.

In accordance with one embodiment, the device further includes a mobile carriage carrying the control unit, the vacuum pump and the analysis tool.

In accordance with one embodiment, the device further includes a flexible electric cable connecting the control unit to the detection dome to carry the control signal or signals and/or an electrical power supply.

In accordance with one embodiment, the control valve is a three-port valve configured to establish communication between the detection chamber and the surrounding atmosphere when in the closed state.

In accordance with a fourth object, the invention provides a leak detection method for detecting a leak in a test zone of a sealing membrane of a tank with the aid of a leak detection dome,
the leak detection dome including a main body and a seal connected to the main body and configured to define a detection chamber between the main body and the sealing membrane, the seal including a peripheral sealing lip configured to come into contact with the sealing membrane and having a closed contour encircling the detection chamber, the leak detection dome further including a mechanical pressure means carried by the main body and including at least one pressure element configured to exert on a portion of the sealing lip a pressure directed toward the membrane when the main body is disposed in the test zone,
said sealing membrane including a plurality of corrugated or plane metal plates that are welded to one another,
the sealing test method including the steps consisting in:
disposing the detection dome against the sealing membrane so as to position the detection chamber in line with at least one weld bead between a first metal plate and a second metal plate and positioning the pressure element to exert the pressure on a portion of the sealing lip that crosses said weld bead,
reducing the pressure in the detection chamber by means of a vacuum pump,
conveying the gas phase contained in the detection chamber to an analysis tool to detect a gas present in the detection chamber.

Embodiments of this kind of method may have one or more of the following features.

In accordance with one embodiment, the detection chamber of the leak detection dome includes a convex zone, said pressure element for exerting the pressure on the portion of the sealing lip that crosses said weld bead being disposed at the periphery of the convex zone.

In accordance with one embodiment, the weld bead between the first metal plate and the second metal plate is a first weld bead and the pressure element is a first pressure element, and the convex zone of the detection chamber is also placed in line with a second weld bead joining the first or second metal plate with a third metal plate, the mechanical pressure means further including a second pressure element positioned to exert the pressure on a portion of the sealing lip that crosses said second weld bead.

In accordance with one embodiment, the metal plates are substantially rectangular and the detection chamber is placed in line with a junction zone between the first, second, third metal plates and a fourth metal plate, the junction zone further including a third weld bead joining the first or second metal plate with the fourth metal plate, the mechanical pressure means further including a third pressure element positioned to exert the pressure on a portion of the sealing lip that crosses said third weld bead.

In accordance with one embodiment, the detection dome has an elongate shape along a longitudinal axis of the detection chamber, the leak detection dome including an elongate zone intended to cover a rectilinear edge of a metal plate, the convex zone being disposed at one end of the elongate zone.

The pressure element or elements may be produced in different ways. In accordance with one embodiment, the pressure element includes a rod mounted to be mobile in translation relative to the main body, a spring urging the rod toward the sealing lip, and a bearing element fixed to one end of the rod and coming to bear against the sealing lip because of the effect of the spring.

In accordance with one embodiment, the pressure element includes first and second rods mounted to be mobile in translation relative to the main body at a distance from one another, springs urging said rods toward the sealing lip, and an elongate bearing element having a first end fixed to one end of the first rod and a second end fixed to one end of the second rod, said elongate bearing element coming to bear against the sealing lip because of the effect of the springs.

In accordance with one embodiment, the pressure element includes a plurality of adjustment elements mounted on the main body and forming a line, an adjustment element including a rod extending perpendicularly in the direction of the sealing lip, the rod having an end the position of which is adjustable in a longitudinal direction of the rod so as to come into contact with the sealing lip.

In accordance with one embodiment, the pressure element further includes a distribution sole plate arranged between the ends of the rods and the sealing lip.

In accordance with other advantageous embodiments, this kind of dome may have one or more of the following features.

In accordance with one embodiment, the detection dome includes:
 a mechanical pressure means carried by the main body and including at least one pressure element configured to exert on a portion of the sealing lip a pressure directed toward the membrane when the main body is disposed in the test zone.

Thanks to these features, the detection dome may quickly be placed on a test zone in order for the seal to be able to form a detection chamber over all the test zone. Moreover, the mechanical pressure means enables the sealing lip to be pressed over one or more portions, in particular where there is a risk of the seal being lifted off the sealing membrane, in order to render reliable the detection of any leak by the detection dome.

The detection dome is advantageously able to detect a tracer gas that has been injected for the requirements of the test, for example helium or a gas from the surrounding air. In accordance with one possibility offered by the invention, this tracer gas is not necessarily injected into the zone whose seal is under test; it may be injected into the zone in some other manner. By "surrounding air" is meant a gas phase present in a composition close to the surrounding dry air, that is to say comprising approximately 78% nitrogen, 21% oxygen, 0.9% argon and rare gases and volatile organic compounds, liable to be emitted by a glue used in the thermally insulating barrier or coming from the insulating solid materials.

Moreover, thanks to the leak detection dome according to the invention, it is now possible to obtain without difficulty an absolute pressure below 100 Pa in the detection chamber, for example a pressure of the order of 50 to 60 Pa (0.5-0.6 mbar).

In accordance with one embodiment, the pressure element is an elastically deformable element that exerts a pressure on the portion of the sealing lip by elastic deformation.

Accordingly, the elasticity of the pressure element makes it possible when it is deformed elastically to exert a return force on the sealing lip toward the sealing membrane.

In accordance with one embodiment, the pressure element is oriented perpendicularly to the contour of the peripheral sealing lip.

In accordance with one embodiment, the sealing lip has a service state, when a reduced pressure is applied in the detection chamber, and a pinch portion of the sealing lip is retained between the main body and the sealing membrane over at least a part of the periphery of the detection chamber, advantageously over all the periphery of said chamber.

In accordance with one embodiment, the leak detection dome has an elongate shape with a length greater than or equal to 0.5 m, preferably greater than or equal to 1 m, more preferably greater than or equal to 2 m. Moreover, the leak detection dome may have a width between 10 and 20 centimeters (cm), preferably between 14 cm and 16 cm.

Where the weight of this kind of detection dome is concerned, this could be between 3 kilos and 25 kilos inclusive, preferably between 5 and 10 kilos inclusive, depending in particular on the materials used, its length and its width.

In accordance with one embodiment, the mechanical pressure means includes a plurality of pressure elements configured to exert a pressure on a plurality of portions of the sealing lip, portions being situated at the two ends of the sealing lip in a longitudinal direction.

In accordance with one embodiment of the invention, portions of the lip seal pressed by the mechanical pressure means are situated at the two ends of the sealing lip in a longitudinal direction, i.e. at both ends of the dome given that the latter has a longitudinal general shape.

Accordingly, the mechanical pressure means applies a pressure over different zones where there is a risk of the seal lifting, namely the ends of the seal.

In accordance with one embodiment, the sealing lip includes at least one notch having a shape corresponding to that of a corrugation of the membrane, the notch being intended to straddle the corrugation.

In accordance with one embodiment, the sealing lip includes at least two notches, for example three notches.

Thanks to these features it is possible to place the detection dome on a sealing membrane consisting of corrugated plates, the notch or notches enabling the dome to straddle the corrugations.

The leak detection dome is therefore able, when it is used on a membrane zone including corrugations, to test the weld zones present over a plurality of corrugations, for example at least three (3) corrugations and up to almost around ten corrugations. Associating a plurality of detection domes alongside one another or one after the other may also be envisaged in order to form a greater test zone length. In accordance with one embodiment, a single vacuum pump may be used to generate the vacuum required in the leak detection domes associated with one another.

In accordance with one embodiment, a portion of the sealing lip pressed by the mechanical pressure means is situated at a base of the notch.

Thanks to this feature, it is possible to place the detection dome on a sealing membrane consisting of corrugated plates, the notch or notches enabling the dome to straddle the corrugations.

Accordingly, the mechanical pressure means applies a pressure over a zone where there are risks of the seal lifting due to the change of slope of the notch.

In accordance with one embodiment, the mechanical pressure means includes a plurality of pressure elements configured to exert a pressure on a plurality of portions of the lip seal, portions being situated at the bases of the notch or notches.

Accordingly, the mechanical pressure means applies a pressure over different zones where there is a risk of the seal lifting, namely the base of the notch or notches.

In accordance with one embodiment, the portion of the lip seal is situated on a top of the notch.

In accordance with one embodiment of the invention, all the portions of the lip seal situated at the bases of the notch are pressed by the plurality of pressure elements of the mechanical means.

In accordance with one embodiment, at least one, some of the pressure element or elements include a curved blade at least one end of which comes to abut on the base of a notch.

At least one, some of the pressure element or elements advantageously include(s) a curved blade the two ends of which come to abut on the base of two contiguous notches.

Thanks to this feature, positioning the leak detection dome is facilitated because the curved blade will enable adequate placement under pressure of the notches of the lip seal over the two contiguous corrugations of the membrane, regardless of possible slight variations of the distance between those two contiguous corrugations or the approximate positioning of the leak detection dome on the corrugated membrane by one or more operatives.

In accordance with one embodiment, a support element extends over all the length of the main body above the latter and is fixed to the main body.

In accordance with one embodiment, the curved blades are distributed on the sealing lip and are fixed to the support element by fixing means.

In accordance with one embodiment, the curved blades are elastically deformable in such a manner as to exert an elastic return force on the sealing lip when they are deformed.

In accordance with one embodiment, the fixing means include a plurality of pins, each pin including a rod mounted to be mobile on a body, the rod having one end bearing against one of the curved blades, the body being fixed to the support element and also including a spring connecting the rod to the body, the spring acting between the body and the rod in order to position the end of the rod bearing against the curved blade and the spring being configured to exert a return force on the curved blade so that the curved blade comes to press the sealing lip against the bottom of a corrugation.

In accordance with one embodiment, the mechanical pressure means includes a plurality of end pressure elements, the end pressure elements being situated at the two ends of the sealing lip in a longitudinal direction, i.e. at the two ends of the dome given that the latter has a longitudinal shape.

In accordance with one embodiment, at least one of or the end pressure elements include(s) an end pin, the end pin including a rod mounted to be mobile on a body, an elongate bearing element being fixed to one end of the rod, the elongate bearing element coming to bear against the sealing lip, and the body being fixed to the support element, the end pin also including a spring connecting the rod to the body, the spring acting between the body and the rod in order to position the elongate bearing element against the sealing lip, the spring being configured to exert a return force on the elongate bearing member so that the elongate bearing member comes to press the sealing lip against the zone under test.

In accordance with one embodiment, the second end is equipped with an elongate bearing element, the elongate bearing element being configured to transmit the elastic return force over a zone of the sealing lip corresponding to a length of the elongate bearing element.

In accordance with one embodiment, the second end of a first end pin and the second end of a second end pin adjacent the first end pin are fixed to one another with the aid of an elongate bearing element.

In accordance with one embodiment, at least one of or the end pressure elements include(s) a plurality of adjustment elements forming a line of elements, the adjustment element including a rod extending in the direction of the sealing lip and having an end adjustable in a longitudinal direction of the rod so as to come into contact with the sealing lip after adjustment.

In accordance with one embodiment, the pressure element includes a curved blade including a cylindrical sleeve at one of its ends in contact with the lip seal.

Accordingly, the cylindrical sleeve enables uniform application of the pressure of the mechanical pressure means to a part of the sealing lip.

In accordance with one embodiment, the sealing lip includes an envelope that at least partly covers the main body and that is fixed to the main body, the peripheral sealing lip being connected to the envelope in such a manner as to extend it and being curved away from the main body.

In accordance with one embodiment, the cylindrical sleeve has a lengthwise direction, the lengthwise direction of the cylindrical sleeve being substantially orthogonal to the envelope in such a manner that the cylindrical sleeve extends from the envelope to one end of the sealing lip.

In accordance with one embodiment, the sealing lip includes a curved part substantially orthogonal to the envelope, the curved part having a dimension in cross section greater than or equal to 1 cm, preferably greater than or equal to 1.5 cm, more preferably greater than or equal to 2 cm.

In accordance with one embodiment, the seal is made of an elastomer material having a Shore A hardness between 20 and 50 inclusive.

Thanks to these features the seal consists of a material that is sufficiently flexible to be deformed by the mechanical pressure means.

In accordance with one embodiment, the elastomer material of the seal is chosen from polyurethane elastomer and ethylene-propylene-diene monomer (EPDM) rubber. The elastomer material of the seal may also be silicone, nitrile or Viton®.

In accordance with one embodiment, the main body includes a rigid core and the seal includes an envelope applied in an hermetically sealed manner against a peripheral wall of the rigid core.

In accordance with one embodiment, the rigid core includes an opening on a lower surface intended to face toward the test zone.

In accordance with one embodiment, the rigid core includes a channel connecting the recess to an upper surface of the rigid core to connect a vacuum pump.

In accordance with one embodiment, the leak detection dome is oriented in the test zone in such a manner that a length of the leak detection dome is superposed in the test zone.

In accordance with one embodiment, the test zone is a part of a weld bead of the sealing membrane.

Accordingly, the leak detection dome enables verification that there is no defect in the weld bead that could generate a leak in the sealing membrane.

In accordance with one embodiment, the test zone is situated on a corrugated sealing membrane.

In accordance with one embodiment, the peripheral sealing lip is conformed to adapt to the geometry of said at least one corrugation.

In accordance with one embodiment, the portion of the weld bead is crossed by at least two parallel corrugations, for example three parallel corrugations of the membrane and the peripheral sealing lip is conformed to adapt to the geometry of said corrugations.

In accordance with one embodiment, the peripheral sealing lip includes at least two notches having a shape corresponding to that of a corrugation of the membrane projecting toward the interior of the tank, said notches being intended to straddle said corrugation.

In accordance with one embodiment, at least one corrugation of the membrane projects toward the interior of the tank, the detection dome being disposed against the membrane in such a manner that the notches straddle the corrugation.

In accordance with one embodiment, the peripheral sealing lip includes at least two projecting zones having a shape corresponding to that of a corrugation of the membrane projecting toward the exterior of the tank.

In accordance with one embodiment, the detection dome is disposed against the membrane in such a manner that the projecting zones are inserted in the corrugation.

In accordance with one embodiment, the pressure in the detection chamber is reduced to an absolute pressure value between 10 and 1000 Pa inclusive, preferably less than 100 Pa absolute.

In accordance with one embodiment, the gas phase is analyzed for 5 seconds or more.

In accordance with one embodiment, the variable representative of a quantity of gas in said gas phase is compared to a threshold and it is determined that the seal of the portion of the weld bead is defective if the representative variable is above said threshold.

In accordance with embodiments, the analysis tool is configured to detect a tracer gas or to detect a component of the surrounding air.

BRIEF DESCRIPTION OF THE DRAWINGS

The invention will be better understood and other aims, details, features and advantages thereof will become more clearly apparent in the course of the following description of a plurality of particular embodiments of the invention given by way of nonlimiting illustration only with reference to the appended drawings.

DESCRIPTION OF THE EMBODIMENTS

There will be described hereinafter a leak detection device that can be used to detect leaks in various sealed assemblies, for example a welded assembly. In the examples hereinafter the welded assembly is a sealing membrane for a fluid tank.

Figure 1:
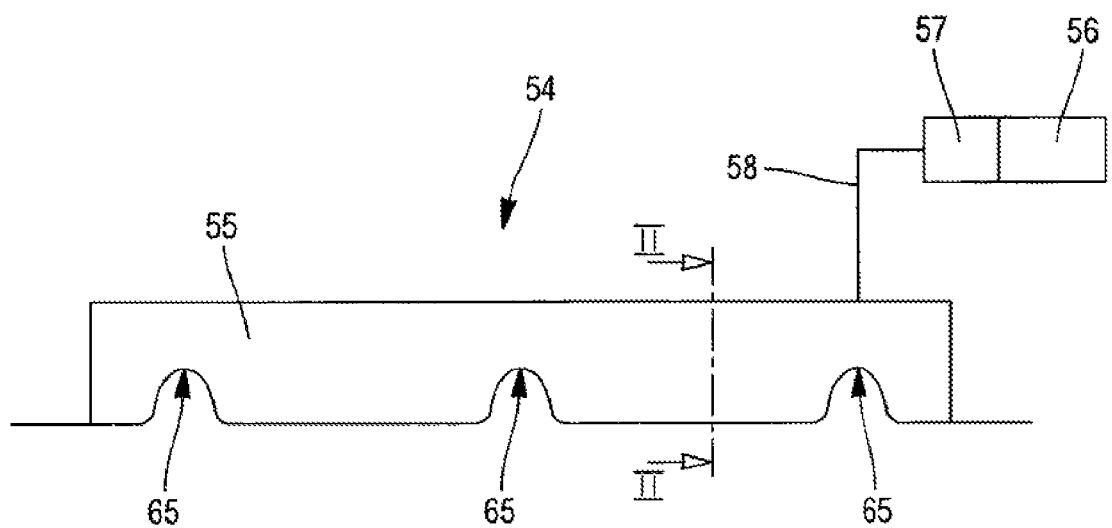
FIG. 1 is a schematic view of a leak detection device in accordance with a first embodiment.

A leak detection device 54 as represented in FIG. 1 is used during the step of the sealing test enabling verification of the seal of the weld beads of a membrane 5, 8.

The leak detection device 54 includes a detection dome 55 that is intended to be disposed against the internal face of the membrane 5, 8 facing a portion of the weld bead under test.

The detection dome 55 has an elongate shape and a length between 0.5 and 4 m inclusive, for example of the order of 1 m. The length of the detection dome 55 is advantageously as great as possible in such a manner as to verify the seal of a larger zone during one and one only test. However, the choice of that length of the dome could be adapted as a function on the one hand of the dimensions of the membrane 5, 8 under test and on the other hand in view of its maneuverability by a minimum number of operatives, preferably by a single operative. An elongate shape is particularly suitable for testing an assembly of rectangular metal plates in which the weld beads essentially follow the rectilinear edges of the plates.

Figure 2:
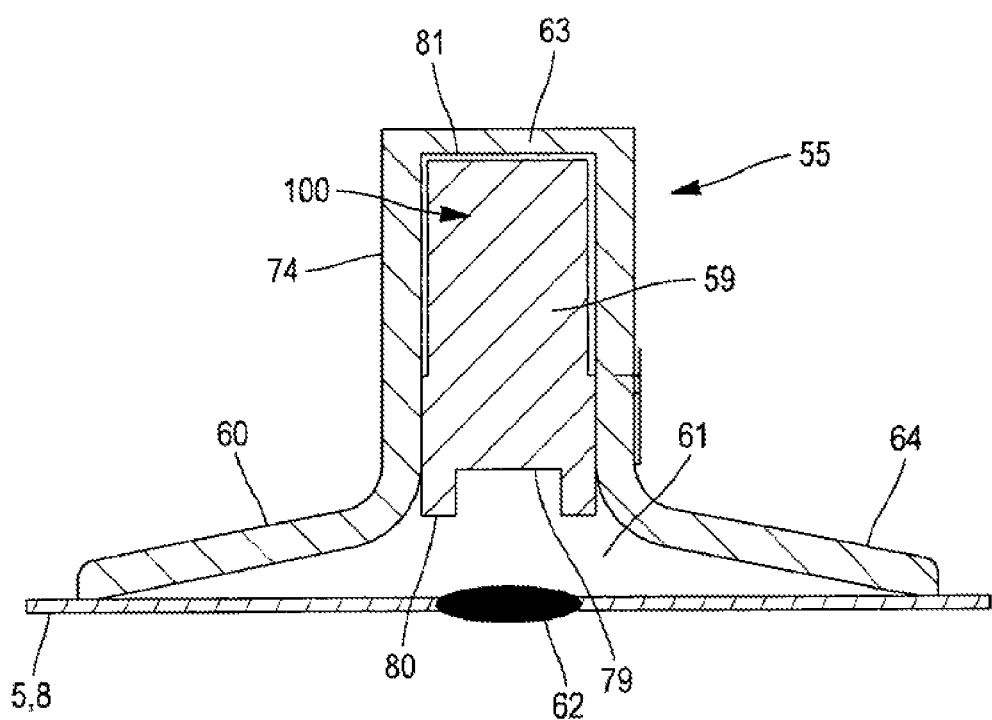
FIG. 2 is a view in cross section on the plane II-II of the detection dome of the leak detection device from FIG. 1.

As represented in FIG. 2, the detection dome 55 includes a rigid main body 100 and a flexible seal 60 that are fixed to one another and arranged to define with the membrane 5, 8 under test a sealed detection chamber 61 disposed facing the portion of the weld bead 62 under test.

Returning to FIG. 1, it is seen that the leak detection device 54 also includes an analysis tool 56 that is connected to the detection chamber 61 and enables detection of a predefined gas, for example a tracer gas or a gas from the surrounding air present on the other side of the welded assembly under test. As soon as the analysis tool 56 detects the predefined gas in a quantity above a threshold it may be concluded that the portion of the weld bead 62 under test has a defective seal. In accordance with one embodiment, the analysis tool 56 is a mass spectrometer.

The leak detection device 54 also includes a vacuum pump 57 that is associated with said analysis tool 56. The vacuum pump 57 is connected on the one hand to the detection chamber of the detection dome 55 in such a manner as to enable reduction of the pressure in the detection chamber and on the other hand to the analysis tool 56 in such a manner as to conduct the gas contained in the detection chamber 61 to the analysis tool 56.

The vacuum pump 57 is connected to the detection dome 55 via a tube 58 that is preferably flexible. The tube 58 is connected to a channel that is formed in the main body 100 and discharges into the detection chamber 61.

Figure 3:
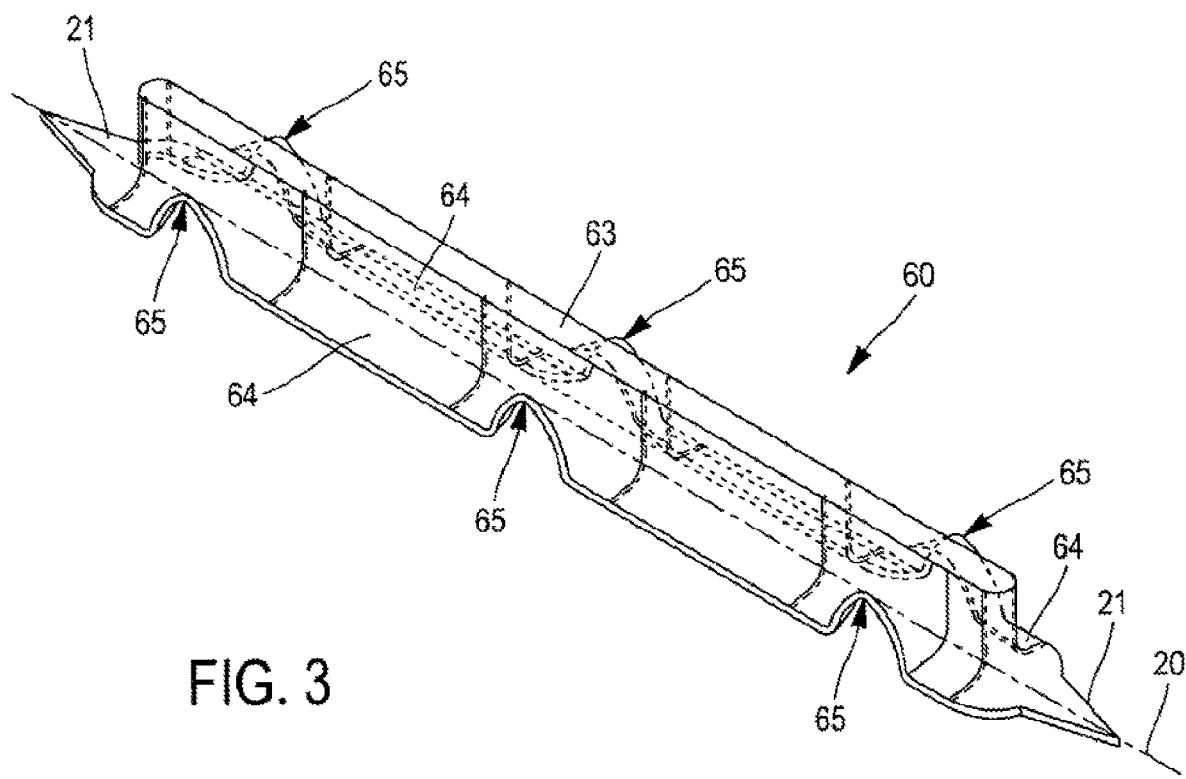
FIG. 3 is a perspective view of a seal in accordance with a first embodiment.

As represented in FIGS. 2 and 3 the main body 100 includes a rigid core 59 and the seal 60 includes an envelope 63 espousing the shape of the rigid core 59 and a peripheral sealing lip 64 that extends the envelope 63 downwards. The envelope has a bottom 63 that covers the upper surface of the rigid core 59 and a peripheral wall 74 that espouses the periphery of the rigid core 59. The bottom 63 includes at least one hole, not represented, to which the tube 58 connected to the vacuum pump 57 is connected in sealed manner. The rigid core 59 includes on its lower surface 80 a recess 79 over all the length of the rigid core 59. When reducing the pressure in the detection chamber 61 the recess 79 ensures that the test zone 62 is always in fluidic contact with the detection chamber 61 despite downward movement or the rigid core 59 toward the membrane 5, 8 due to deformation of the sealing lip 64. Moreover, the rigid core 59 also includes a channel 82, not represented in FIG. 2 because present only in a plane at the level of the tube 58, enabling the recess 79 to be connected to an upper surface 81 of the rigid core 59. The channel 82 enables communication between the detection chamber 61 and the vacuum pump 57 and the analysis tool 56 via the tube 58.

The peripheral sealing lip 64 is curved toward the exterior of the detection dome 55 and is therefore configured to flex and to be pressed against the membrane 5, 8 when the pressure in the sealed chamber 61 is reduced. In other words, the peripheral sealing lip 64 includes a section having the general shape of an L.

The outwardly curved portion of the peripheral lip seal 64 has a width of the order of 15 to 40 mm. The peripheral sealing lip 64 is conformed to match the geometry of the membrane 5, 8 along the weld bead under test. Also, in FIG. 3, the peripheral sealing lip 64 includes notches 65 having a shape corresponding to that of the corrugations of the membrane 5, 8 that the detection dome 55 is intended to straddle when it is in position against the portion of the weld bead 62 under test.

The seal 60 is advantageously made of an elastomer material having a Shore A hardness between 20 and 50 inclusive. The seal is for example made of polyurethane elastomer, EPDM rubber, silicone, nitrile or Viton®.

FIG. 3 also illustrates the median longitudinal axis 20 of the detection chamber 61 surrounded by the peripheral sealing lip 64. In service, it is desirable to center the detection chamber 61 correctly on the weld bead to be checked, in particular because the detection chamber 61 can be relatively narrow. To this end the detection dome 55 may include a sighting device which, see FIG. 3, is produced in the form of two indicator points 21 that are placed at the two longitudinal ends of the detection dome and oriented in line with the median longitudinal axis 20. Alternatively, only one of the two indicator points 21 could be provided. Here the indicator points 21 are made in one piece with the peripheral sealing lip 64, which ensures that the indicator points 21 are in the immediate vicinity of the membrane 5, 8 and therefore limit the risks of sighting errors through parallax. The indicator points 21 may however be produced in other ways, for example in the form of attached parts. The indicator points 21 may be fixed to other parts of the detection dome 55.

Figure 21:
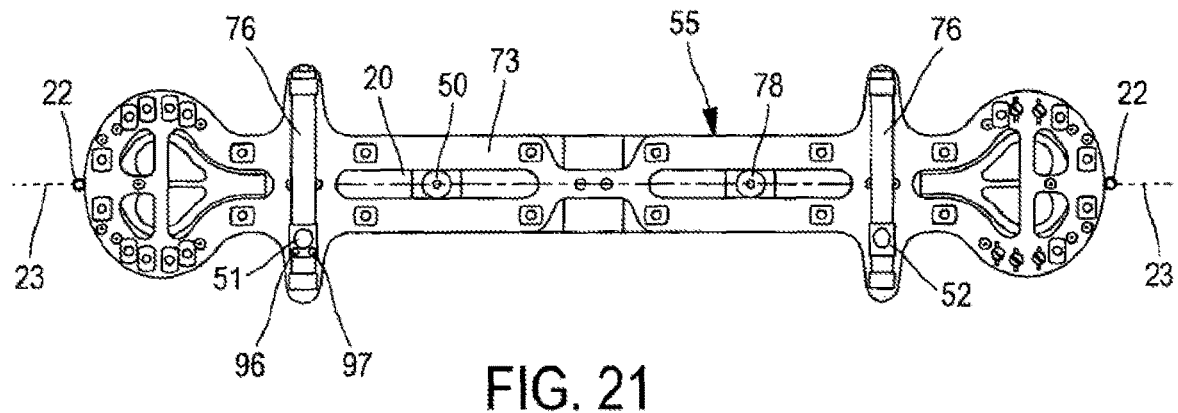
FIG. 21 is a view from above of the leak detection dome from FIG. 13, also illustrating an optical sighting device.

FIG. 21 illustrates an optical sighting device consisting of two laser diodes 22 attached to the two longitudinal ends of the detection dome 55 and emitting light beams 23 also oriented in line with the median longitudinal axis 20. Alternatively, only one of the two laser diodes 22 could be provided. The laser diode 22 may be placed on the peripheral sealing lip 64 or above the peripheral sealing lip 64, for example on a support element 73 that will be described later. In this case the light beam 23 is preferably inclined slightly downwards to impinge on the membrane 5, 8 and therefore to limit the risks of sighting errors through parallax.

Figure 4:
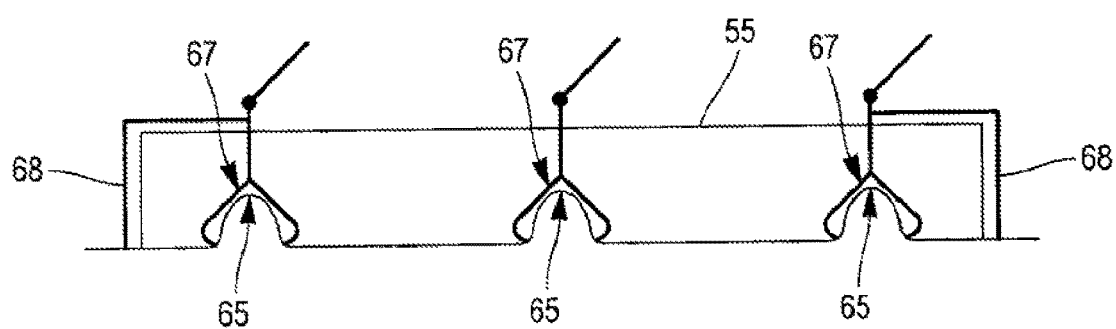
FIG. 4 is a schematic view of a variant leak detection device in which the detection dome is equipped with a clamping system.

In an embodiment illustrated schematically in FIG. 4 the detection dome 55 is moreover equipped with a mechanical pressure means 66 which in this embodiment is a clamping system 66 adapted to press the peripheral sealing lip 64 against the membrane 8 under test in such a manner as to guarantee that the detection chamber 61 is sealed. Here the clamping system 66 includes a clamp 67 at the level of each of the notches 65 of the peripheral sealing lip 64. Each clamp 67 includes two branches disposed on respective opposite sides of the notch 65 and configured to apply a force clamping the peripheral sealing lip 64 against the membrane 8. The branches are advantageously configured to clamp the peripheral sealing lip 64 against the sealing membrane in the vicinity of the base of the corrugation.

Moreover, in the embodiment represented, the clamping system 66 further includes at the level of each of the longitudinal ends of the detection dome 55 a mobile finger 68 that is configured to come to press one of the longitudinal ends of the peripheral sealing lip 64 against the membrane 8.

Figure 5:
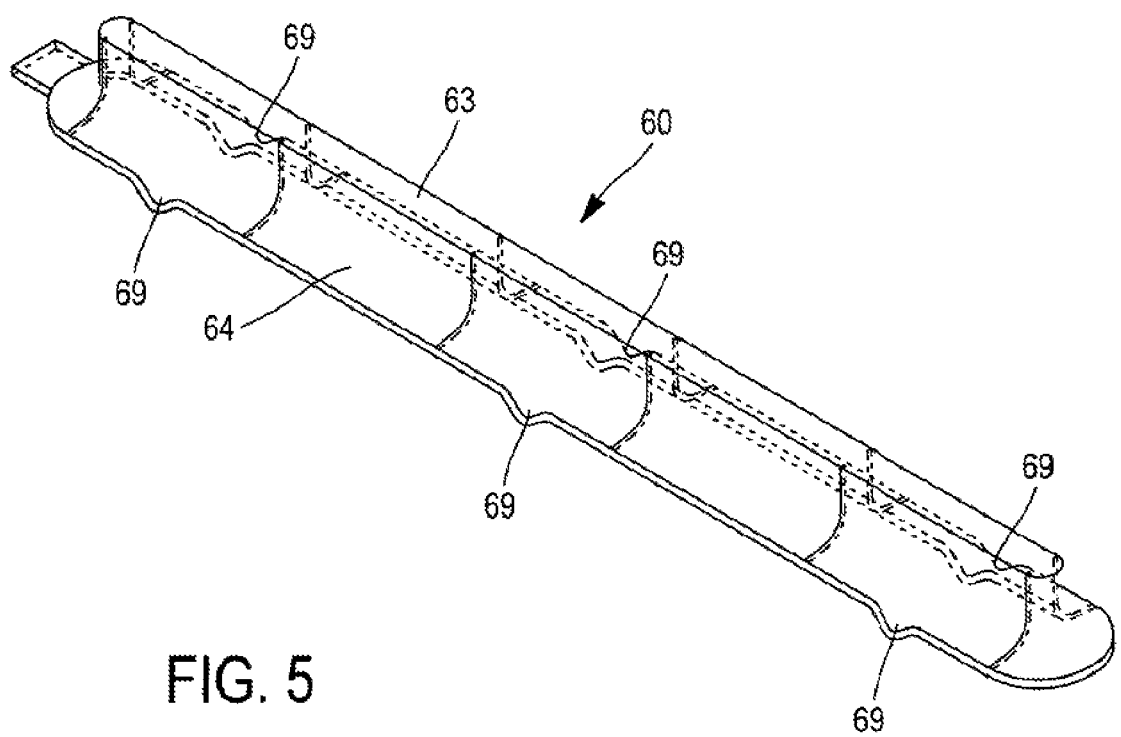
FIG. 5 is a perspective view of a seal in accordance with a second embodiment.

FIG. 5 illustrates a seal 60 in accordance with an alternative embodiment. That seal 60 is conformed to adapt to a membrane 5 in which the corrugations project toward the exterior of the tank. One such membrane is for example a Mark V technology secondary membrane 5. Also, the peripheral sealing lip 64 includes projecting zones 69 intended to come to be inserted inside the corrugations of the membrane 5.

There follows one procedure for detecting a weld bead seal defect.

Figure 6:
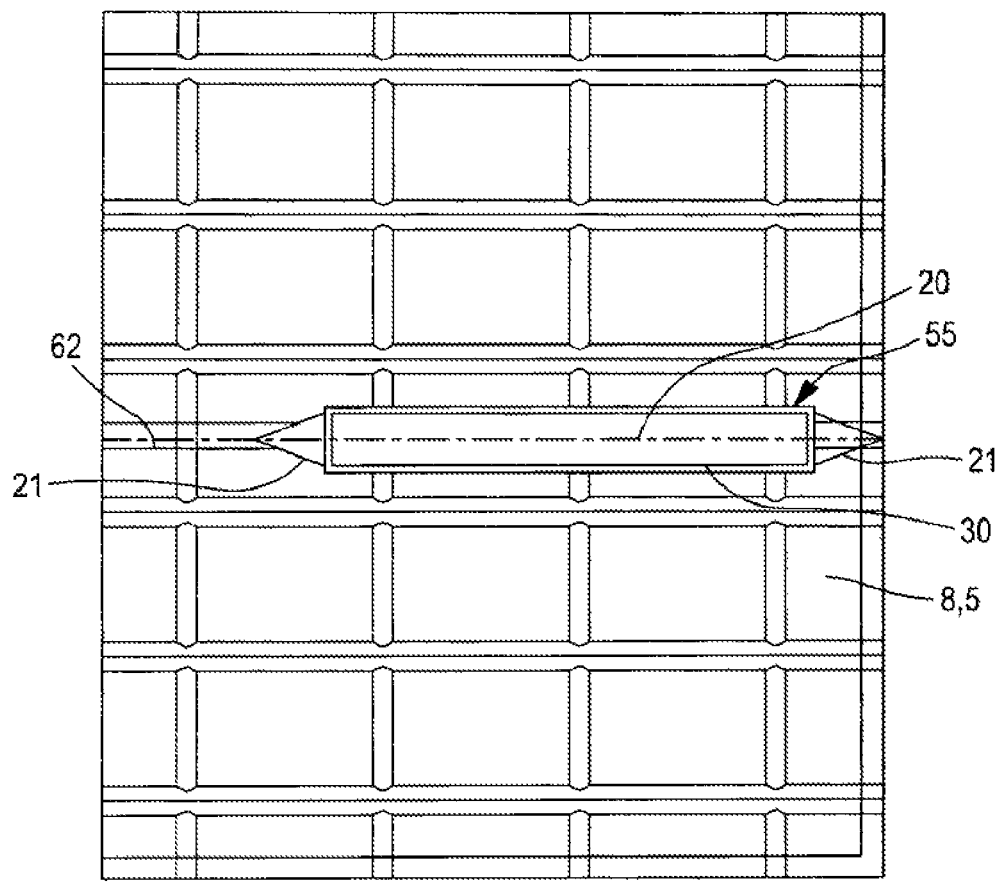
FIG. 6 illustrates schematically the positioning of the detection dome facing a portion of a weld bead providing the seal between two adjacent corrugated metal plates of a membrane.

Initially the detection dome 55 is disposed facing the portion of the weld bead 62 under test, which extends along a rectilinear edge of a rectangular plate, as represented in FIG. 6.

It is necessary to ensure that the detection dome 55 is properly centered relative to the weld bead 62 so that the two lateral parts of the curved portion of the peripheral sealing lip 64 are disposed on respective opposite sides of the weld bead 62.

To this end, FIG. 6 also illustrates the sighting device, here taking the form of the two indicator points 21 that are placed precisely superposed on the weld bead 62 by the operative so as therefore to align the median longitudinal axis 20 of the detection chamber with the weld bead 62. In the case of the optical sighting device from FIG. 21, it is the light beams 23 that will be placed so as to be precisely superposed on the weld bead 62.

FIG. 6 also illustrates schematically the contour 30 of the detection chamber 61, namely the line of sealed contact between the peripheral sealing lip 64 and the membrane 5, 8.

The vacuum pump 57 is then started in order to reduce the pressure in the detection chamber 61 and to favor the migration of the gas through defective zones of the weld bead 62.

As soon as the pressure inside the detection chamber 61 falls below a pressure threshold Ps a flow of gas is conveyed from the detection chamber 61 to the analysis tool 56 and a leakage rate $\varphi$ of the predefined gas, for example the tracer gas, is measured for a minimum duration Tm. The leakage rate $\varphi$ is then compared to a threshold $\varphi s$.

If the leakage rate $\varphi$ is below the threshold $\varphi s$, it is then concluded that there is no seal defect in the tested portion of the weld bead 62. In this case the detection dome 55 is then detached from the membrane 5, 8 by releasing the reduced pressure in the detection chamber 61, for example by opening a gas inlet 71 represented in FIG. 7. The detection dome 55 is then disposed facing an adjacent portion of the weld bead 62 with an overlap between the two portions successively tested in such a manner as to guarantee that the seal of the weld bead 62 has been tested over all the length of said weld bead 62.

On the contrary, if the leakage rate $\varphi$ is above or equal to the threshold $\varphi s$, it is then concluded that there is a seal defect in the tested portion of the weld bead 62. Corrective welding measures are then applied in order to correct the defect.

By way of example, for a helium concentration in the thermally insulating space of the order of 20% the pressure threshold below which the leakage rate is measured is between 10 and 1000 Pa absolute inclusive, preferably below 100 Pa absolute. For example, the minimum duration of the measurement of the leakage rate is 5 seconds and the threshold cps is of the order of $1.0\times10^{-6}$ Pa·m$^3$·s$^{-1}$.

Figure 7:
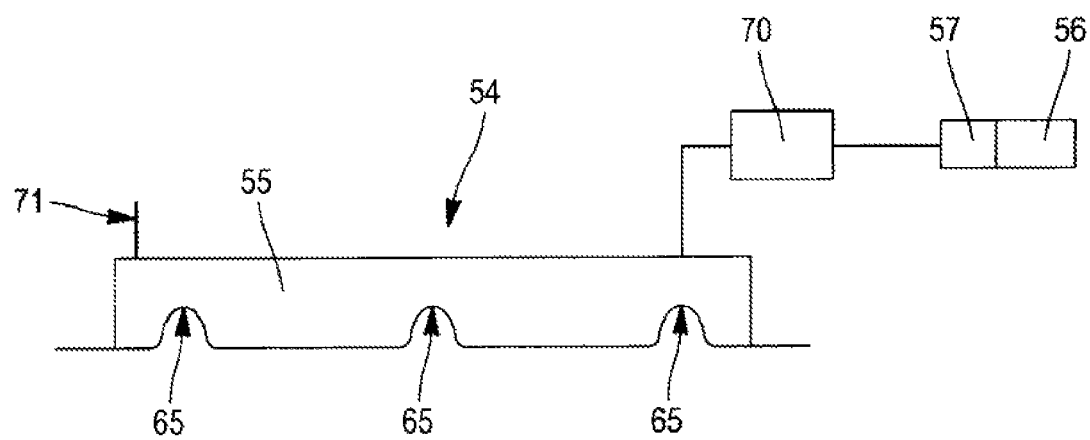
FIG. 7 is a schematic view of a leak detection device in accordance with a second embodiment.

FIG. 7 represents a leakage detection device 54 in accordance with another embodiment. That embodiment differs from the embodiment described above in that it further includes a homogenization chamber 70 that is disposed between the detection chamber 61 and the analysis tool 56 and in that the detection dome 55 includes a gas inlet 71.

The gas inlet 71 is equipped with a cock for establishing or interrupting a flow of ambient air toward the detection chamber 61. The homogenization chamber 70 is connected to one end of the detection chamber 61 whilst the gas inlet 71 is connected to the opposite end of the detection chamber 61.

The operating mode of the leak detection device 54 is as follows.

When the detection dome 55 is disposed facing the portion of the weld bead 62 under test the cock of the gas inlet 71 is closed and the vacuum pump 57 is started in order to reduce the pressure in the detection chamber 61. As soon as the pressure inside the detection chamber 61 falls below a pressure threshold Ps the cock of the gas inlet 71 is opened and all of the gas contained beforehand in the sealed chamber is transferred to the homogenization chamber 70. The homogenization chamber 70 has a volume greater than that of the detection chamber 61 and for example includes a piston system for accurately aspirating all of the gas contained in the detection chamber 61.

The gas contained in the homogenization chamber 70 is then transferred in the direction of the analysis tool 56 in order to determine a gas leakage rate cp.

This kind of embodiment is advantageous in that it enables reduction of the time to diffuse the gas inside the detection dome 55 and thus enables reduction of the minimum measuring time. This is in particular advantageous when the time for the gas to migrate from one end to the other of the detection dome 55 is liable to be long because of a long length of the detection dome 55 and/or if the reduction of the pressure inside the detection chamber 61 is insufficient.

Figure 8:
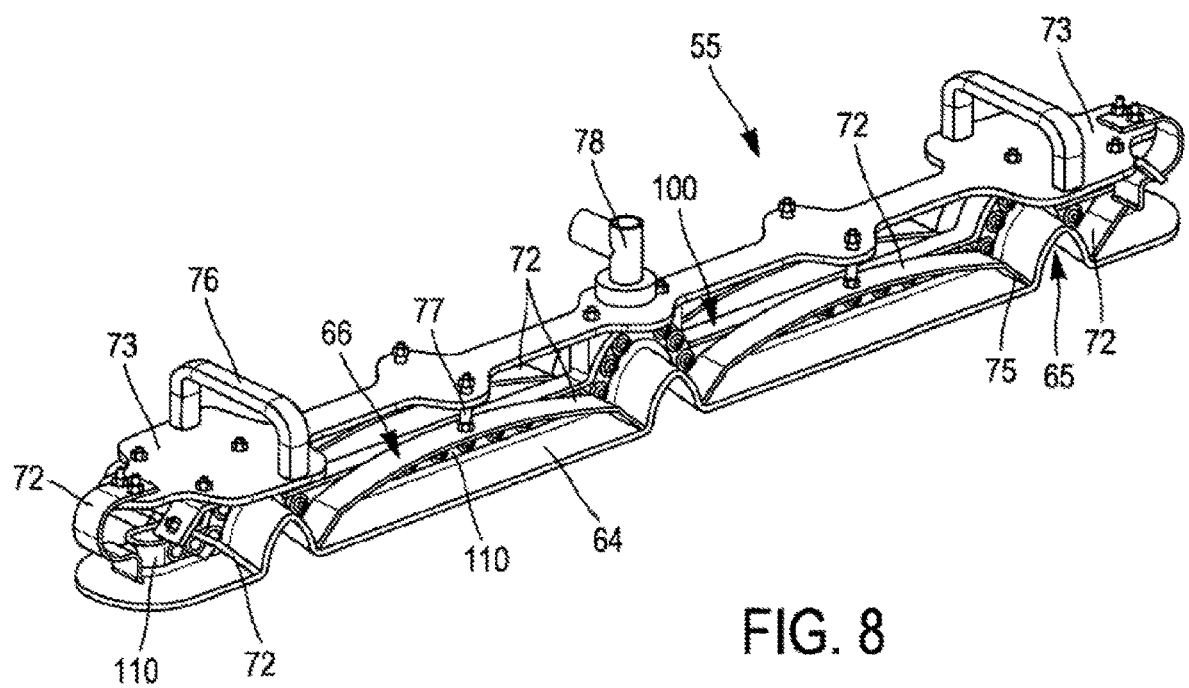
FIG. 8 is a perspective view of a leak detection dome in accordance with a third embodiment.

FIG. 8 represents a detection dome 55 in accordance with a third embodiment. The detection dome 55 from FIG. 8 is of similar design to the detection dome 55 from FIG. 4 but different in particular where the mechanical pressure means 66 is concerned. In fact, the detection dome 55 includes a main body 100 extending in a longitudinal direction, a flexible seal 60 fixed to the main body 100, and a mechanical pressure means 66 carried by the main body and configured to exert a pressure directed toward the membrane 5, 8 on the seal 60. The main body 100 includes a rigid core 59. The rigid core 59 includes a channel 82 enabling connection of a lower surface 80 to an upper surface 81 of the rigid core 59. The channel 82 enables communication between the detection chamber 61 and the gas outlet 78.

The seal 60 includes an envelope 63 fixed to the rigid core 59 by fixing means 110, for example consisting of a circlip surrounding all the circumference of the rigid core 59 and of the seal 60 and fixing those two elements 59/60 to one another by means of a mechanical fixing element such as screws. The seal 60 also includes a peripheral sealing lip 64 connected to the envelope 63 and having a closed contour enabling encirclement of the part of the weld bead 62 under test. The peripheral lip 64 is moreover curved in the opposite direction to the main body 100 in such a manner as to have a part of the peripheral lip 64 substantially parallel to the membrane 5, 8. The peripheral sealing lip 64 also features a plurality of spaced notches 65 on its circumference, the notches 65 having the shape of the corrugations of the membrane 5, 8 under test. Upon placing the detection dome 55 on the membrane 5, 8 the notches 55 therefore enable the detection dome 55 to adapt to the corrugated shape of the membrane 5, 8. A gas outlet 78 enabling evacuation of the gas upon reducing the pressure in the detection chamber 61 passes in particular through the main body 100 and the support element 73.

A support element 73 extends the whole length of the main body 100 above the latter and is fixed to the main body 100. Handling handles 76 are fixed to the two longitudinal ends of the support element 73 in such a manner as to enable manipulation of the detection dome 55 by an operative and possibly actuation of the mechanical pressure means by a force supplied by the operative.

The mechanical pressure means 66 is made up of a plurality of pressure elements 72 that are in the form of curved blades 72 distributed over the sealing lip 64 and fixed to the support element 73 by fixing means 77. The curved blades 72 are elastically deformable in such a manner that, when they are deformed, they exert an elastic return force on the sealing lip 64 in order to press it onto the membrane 5, 8. To render the seal of the detection chamber 61 reliable, it appears judicious to press the sealing lip 64 in the zones in which the risk of lifting is greater. This is why curved blades 72 are situated in particular at the bases of the notches 64 of the sealing lip 64 and at the longitudinal ends of the detection dome 55 on the sealing lip 64.

A plurality of curved blades 72 are fixed at one of their ends to the support element 73 whilst the other end is placed on the lip seal 64. These blades 72 are in particular placed at the ends of the detection dome 55. Other curved blades 72 are for their part fixed at their center to the support element 73 whilst their two ends are placed on the sealing lip 64 in such a manner as to apply pressure to two different zones, these blades 72 being in particular placed between two notches 65.

The curved blades 72 have at each of their ends in contact with the sealing lip 64 a cylindrical sleeve 75. The cylindrical sleeve 75 in particular enables homogeneous bearing on the sealing lip 64, preventing any punch-through that could degrade the integrity of the sealing lip 64. The cylindrical sleeve 75 extends in a direction orthogonal to the longitudinal direction of the main body 100. The length of a cylindrical sleeve 75 is moreover substantially equal to the dimension of the part of the sealing lip 64 projecting from the main body 100, in the direction in which the cylindrical sleeve 75 extends. Thus the cylindrical sleeve 75 enables the mechanical pressure means 66 to exert a pressure in an effective manner on the seal lip.

Upon placing the leak detection dome 55 in the zone under test, it must be certain that the mechanical pressure means 66 correctly presses in sealed manner the seal 60 to be able to test the seal of the weld properly. A problem is therefore to be sure that the mechanical pressure means 66 indeed exercises its role all around the peripheral lip seal 64. Now, the zone under test, in particular at the ends of the detection dome 55, may be a junction zone between a plurality of corrugated metal plates, for example four corrugated metal plates, with the result that the zone is not entirely flat but includes differences in level making it difficult to press on the seal 60.

Figure 13:
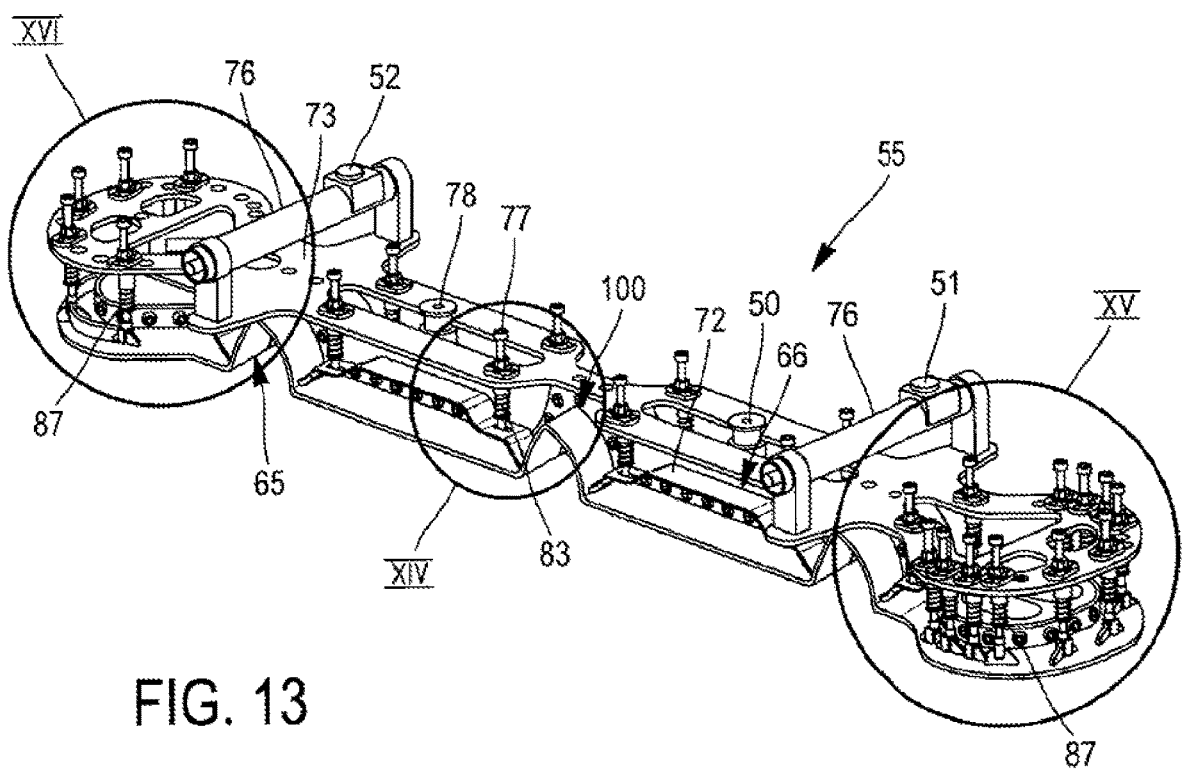
FIG. 13 is a perspective view of a leak detection dome in accordance with a fourth embodiment.

FIG. 13 represents a detection dome 55 in accordance with a fourth embodiment in which the mechanical pressure means 66 has been strengthened at the ends of the detection dome 55 to remedy the lack of flatness of the zone. The detection dome 55 from FIG. 13 is of similar design to the detection dome 55 from FIG. 8 but differs in particular by the shape of the detection chamber, which has two circular zones at the two longitudinal ends that are wider than a central rectilinear band. Other differences concern the mechanical pressure means 66. In fact, the detection dome 55 from FIG. 13 also includes a main body 100 extending in a longitudinal direction, a flexible seal 60 fixed to the main body 100, and a mechanical pressure means 66 carried by the main body and configured to exert a pressure directed toward the membrane 5, 8 on the seal 60. However, here the mechanical pressure means 66 include pressure elements 72 and end pressure elements 87.

Figure 14:
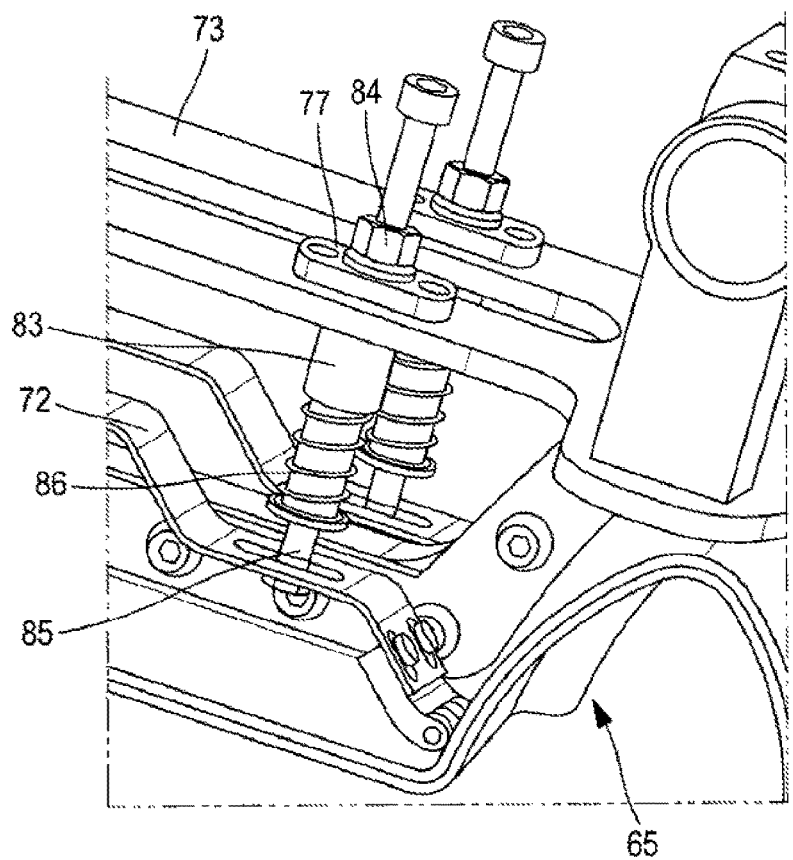
FIG. 14 is a view to a larger scale of the detail XIV from FIG. 13 illustrating a pressure element of the leak detection dome.

Each pressure element 72 includes a curved blade 72 at least one end of which comes to abut on the base of a notch 62. The curved blades 72 situated between two contiguous notches have one of their ends situated against the base of one of the notches 65 and the other of the ends situated against the base of the other of the notches 65. Here, as illustrated in FIG. 14, the pressure elements 72 are fixed by fixing means 77 each including a pin 83. Each pin 83 includes a rod 85 mounted to be mobile on the body 84. The rod 85 has one end bearing against one of the curved blades 72. The body 84 is fixed to the support element 73. The pin 83 also includes a spring 86 connecting the rod 85 to the body 84, the spring 86 acting between the body 84 and the rod 85 in order to position the end of the rod 85 so that it bears against the curved blade 72. Thus the spring 86 is configured to exert a return force on the curved blade 72 so that the curved blade 72 comes to press the sealing lip 64 against the base of the corrugation.

The end pressure elements 87 are situated at the two ends of the sealing lip 64 in a longitudinal direction, i.e. at the two ends of the leak detection dome 55, given that the latter has a longitudinal general shape. The end pressure elements 87 may be designed in accordance with a plurality of distinct variants that can be combinable or not on the same leak detection dome 55. For conciseness, three variants of the end pressure elements 87 are illustrated in FIG. 13 on the same leak detection dome 55.

Figure 15:
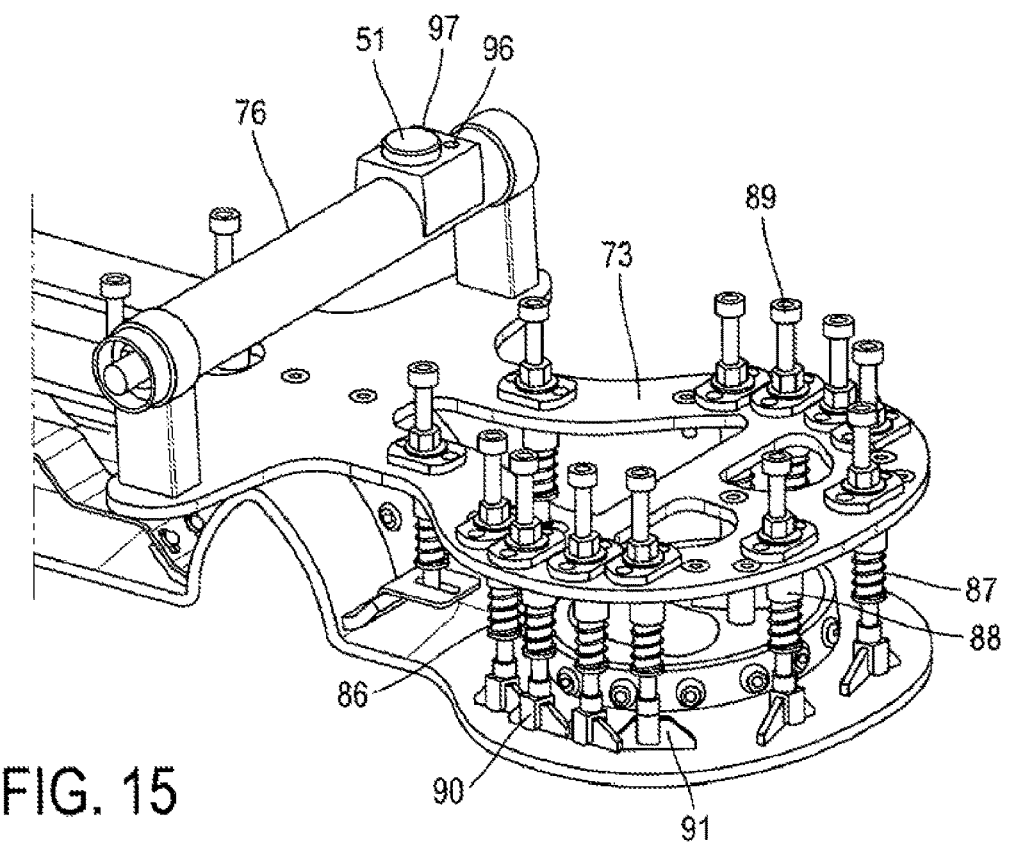
FIG. 15 represents a view to a larger scale of the detail XV from FIG. 13 illustrating a first end of the leak detection dome.
Figure 16:
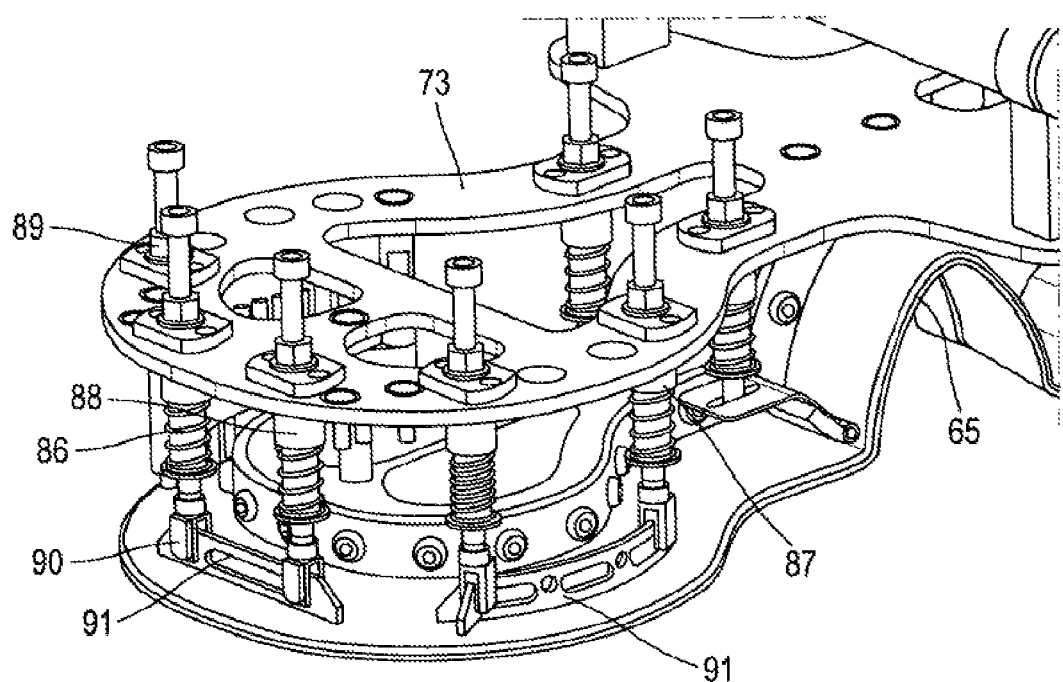
FIG. 16 represents a view to a larger scale of the detail XVI from FIG. 13 illustrating a second end of the leak detection dome.
Figure 17:
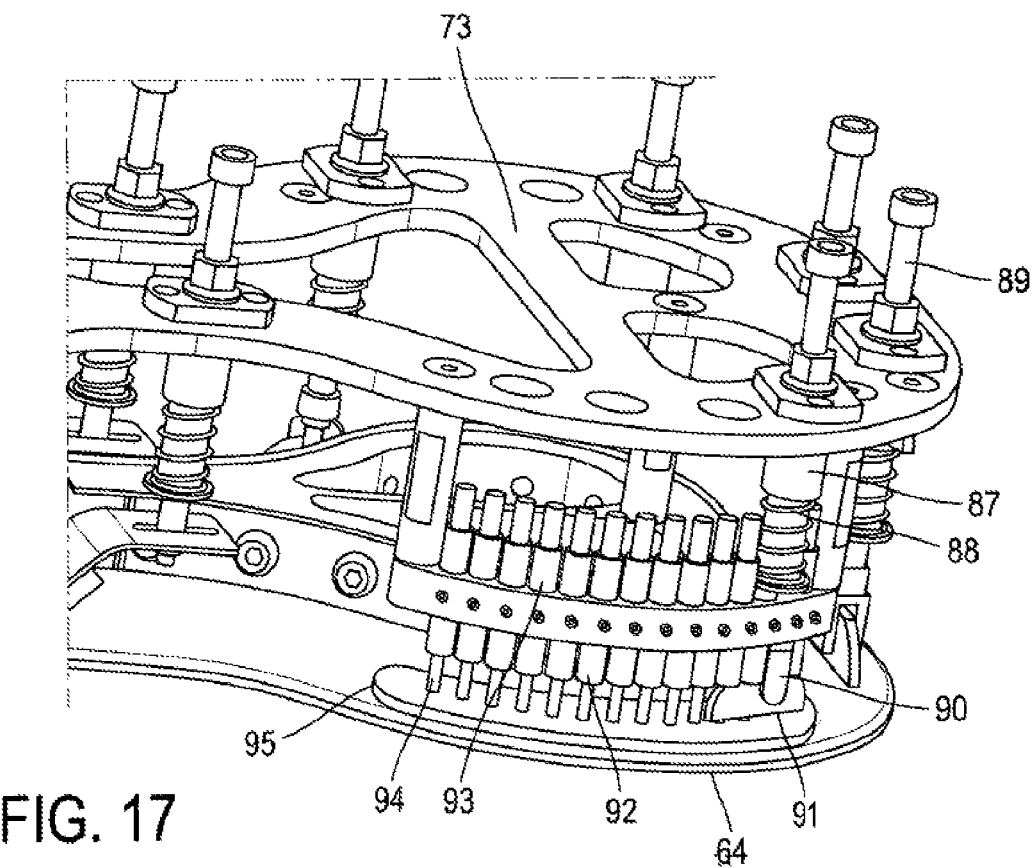
FIG. 17 represents a view to a larger scale of the detail XVI from FIG. 13 seen from a different angle.

FIGS. 15 to 17 represent the three variants of the end pressure elements 87. As illustrated in FIG. 15, in accordance with the first variant the end pressure element 87 includes an end pin 88. Each end pin 88 includes a rod 90 mounted to be mobile on a body 89. An elongate bearing element 91 is fixed to one end of the rod 90, the elongate bearing element 91 coming to bear against the sealing lip 64. The body 89 is fixed to the support element 73. The end pin 88 also includes a spring 86 connecting the rod 90 to the body 89, the spring 86 acting between the body 89 and the rod 90 in order to position the elongate bearing element 91 against the sealing lip 64. Thus the spring 86 is configured to exert a return force on the elongate bearing element 91 so that the elongate bearing element 91 comes to press the sealing lip 64 against the zone under test. In this way the return force is exerted on the sealing lip 64 over all the length of the elongate bearing element 91. In the case of the first variant from FIG. 15, each elongate bearing element 91 is fixed to only one rod 90 of an end pin 88.

A second variant of the end pressure element 87 is illustrated in FIG. 16. The second variant differs from the first variant by the elongate bearing element 91 of the end pins 88, and the other features of the end pressure elements 87 are preserved. In this variant the elongate bearing element 91 is fixed to one end of a rod 90 of a first end pin 88 and to one end of a rod 90 of a second end pin 88 adjacent the first end pin 88. Here the elongate bearing element 91 is longer than in the first variant and is therefore pressed by two end pins 88 distributed over its length so as to form a bearing portion of greater length on the sealing lip 64.

A third variant of the end pressure elements 87 is illustrated in FIG. 17. In this variant the end pressure element 87 includes a plurality of adjustment elements 92 forming a line of elements. The adjustment element 92 includes a rod 93 extending in the direction of the sealing lip 64 and perpendicularly to the zone under test and an end 94 the position of which is adjustable in a longitudinal direction of the rod so as to come into contact with the sealing lip 64 after adjusting the rod 93. Thus it is possible to adjust in a more refined way the end pressure element 87 thanks to the adjustment elements 92 in order to espouse more accurately the zone under test and therefore to improve the seal of the detection chamber 61.

FIG. 17 also illustrates a distribution sole plate 95 that may be arranged between the ends 94 of the rods 93 and the upper surface of the lip seal 64 in order to limit the risk of punching through the sealing lip 64 and thus to increase its durability. The distribution sole plate 95 may be an elongate plate of rectilinear general shape or, as represented, arcuate shape to follow the contour of the sealing lip 64. Its material may be a rigid plastic resin. Connecting sleeves are preferably formed projecting on the upper surface of the distribution sole plate 95 to receive the ends 94 and thus to fix the distribution sole plate 95 relative to the rods 93.

There will be described hereinafter a method of using a leak detection dome 65 as illustrated in FIG. 8 in a leak detection device 54 including said dome 65, a vacuum pump 57 connected to the detection chamber 61 via the gas outlet 78 and an analysis tool 56. Using this kind of detection device 54 enables testing of the seal of a weld bead 62 between two corrugated plates of a sealing membrane 5, 8.

Figure 9:
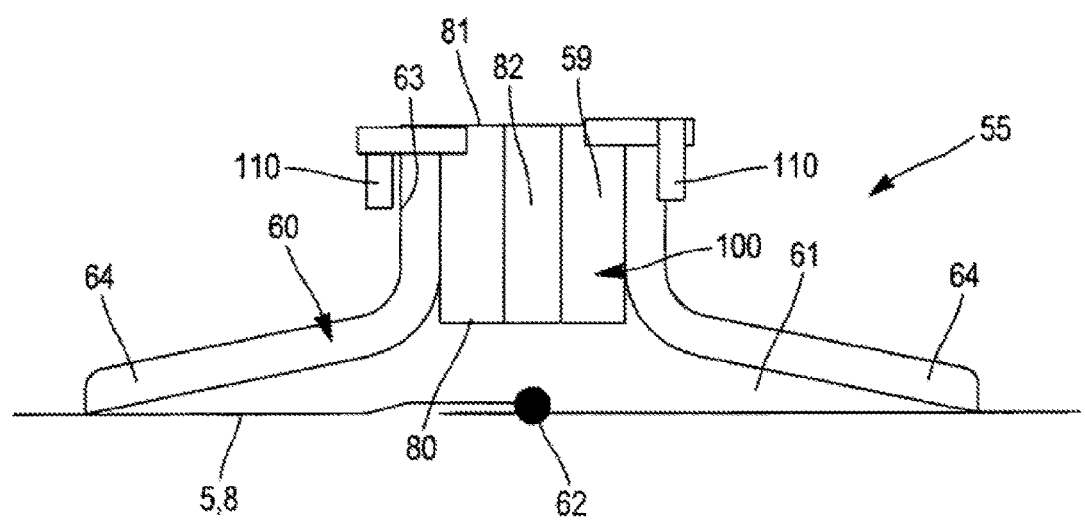
FIG. 9 is a schematic view in cross section of the detection dome from FIG. 8 before reducing the pressure in the detection chamber.

First of all, the detection dome 55 is placed on the zone the seal of which is to be tested, here a part of the weld bead 62, for example by one or more operatives using the handling handles 76. To this end the main body 100 of the detection dome 55 is placed over the weld bead 62 in such a manner that the length of the main body 100 is aligned with and centered on the weld bead 62. If necessary, a sighting device described above may be employed for this. The sealing lip 64 is therefore located on either side of the weld bead 62 and completely encircles the zone of the weld bead 62 under test to form with the main body 100 and the membrane 5, 8 a sealed detection chamber 61, as can be seen in FIG. 9.

After the detection dome 55 has been placed over the weld bead 62, the detection dome 55 is fixed like a sucker to the membrane 5, 8 thanks to the reduce pressure force activated by the vacuum pump 57. Where applicable this reduced pressure force activates the mechanical pressure means 66 in such a manner that it redirects the pressure in order to press the sealing lip 64 onto the membrane 5, 8 in certain well-defined zones.

When the mechanical pressure means 66 exerts a force on the support element 73, the support element 73 transmits the force to the curved blades 72 via their respective fixings, which tends to deform the curved blades 72 elastically. Because of this and by an elastic return effect the curved blades 72 transmit the force to the sealing lip 64 via the cylindrical sleeves 75 in the zones where lifting of the sealing lip is the most probable, namely the longitudinal ends of the main body 100 and the bases of the notches 65.

Figure 10:
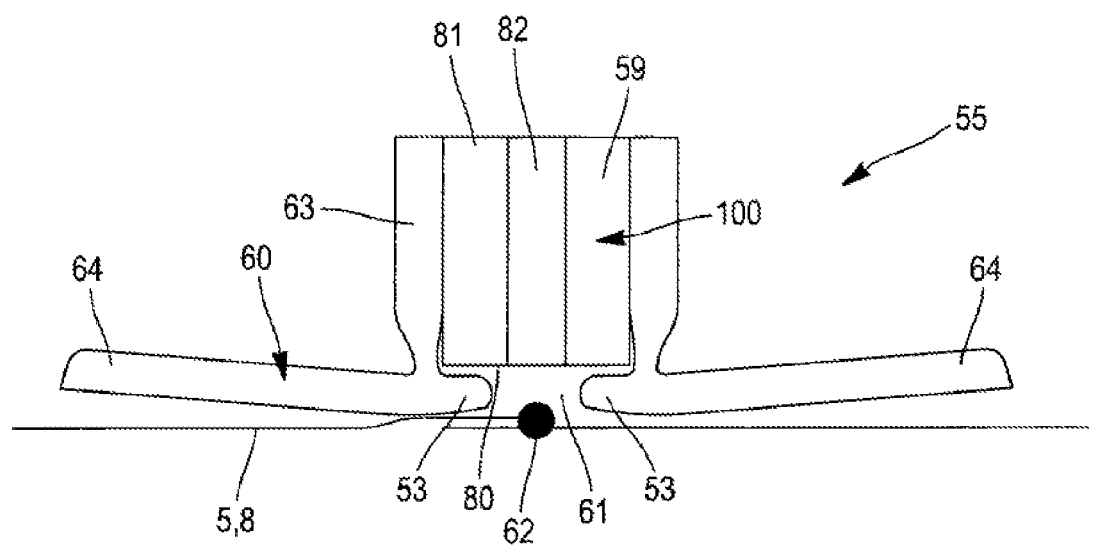
FIG. 10 is a schematic view in cross section of the detection dome from FIG. 8 after reducing the pressure in the detection chamber.

The vacuum pump 57 creates a reduced pressure in the detection chamber 61 via the channel 82 and the gas outlet 78. The flexibility of the sealing lip 64 leads to deformation thereof at the time of the reduced pressure in the detection chamber 61 that tends to reduce the volume of the detection chamber 61. In fact, the sealing lip 64 therefore moves toward each side of the weld bead 62, as can be seen in FIG. 10. As soon as the pressure in the detection chamber 61 falls below a pressure threshold Ps, the gases present in the detection chamber 61 are conveyed toward the analysis tool 56.

The analysis tool 56 then analyzes during a measurement time Tm the gas concentration of the gases present in the detection chamber 61 in such a manner as to obtain a value representative of the evolution of the concentration. That representative value is then compared to a threshold value in such a manner as to determine if the part of the weld bead 62 under test features a sealing defect or not.

If the measured value is below the threshold value it is then concluded that the part under test does not feature any sealing defect and in this case the detection dome 55 is then disposed facing an adjacent portion of the weld bead 62 with an overlap between the two portions successively tested in such a manner as to guarantee that the seal of the weld bead 62 has been tested over all the length of said weld bead 62.

If the measured value is above or equal to the threshold value is then concluded that the tested part of the weld bead 62 features a sealing defect. Corrective welding measures are then implemented in order to correct the defect. Measurements using a complementary detection tool may also be envisaged in such a manner as to locate more precisely the location of the sealing defect.

The sealing lip 64 therefore advantageously occupies two positions according to whether it is in its initial state, that is to say without application of a reduced pressure in the detection chamber 61, or in its service state, when that kind of reduced pressure is applied.

In its initial state the sealing lip 64 rests without pressure on the surface of a sealing membrane 5, 8 whereas in its service state at least a pinch portion 53 situated at an interior end of the sealing lip 64 finds itself pressed under the main body 100 in such a manner as to seal perfectly the contour or the periphery of the detection chamber 61. In fact, thanks to the flexibility of the sealing lip 64, the latter comes to be pinched between the main body 100 and the membrane 5, 8 when the reduced pressure is applied. This positioning of the pinch portion 53 of the sealing lip 64 between the main body 100, crushed or compressed by the latter, and the sealing membrane 5, 8 makes an effective contribution to obtaining a perfect seal of the detection chamber 61, thus enabling a vacuum of at most 1500 Pa (15 mbar) to be obtained and maintained, or even a much lower pressure.

In accordance with a preferred embodiment the sealing lip 64 therefore has a service state when a reduced pressure is applied in the detection chamber 61 in which a pinch portion 53 of the sealing lip 64 is retained between the main body 100 and the sealing membrane 5, 8 over at least a part of the periphery of the detection chamber 61, or even over all the periphery of said chamber 61. Thanks to this pinching, it is possible to dispense with all or part of the mechanical pressure means described above.

In a variant embodiment the peripheral sealing lip 64 is formed with the pinch portion 53 projecting permanently under the main body 100, that is to say also in the initial state with no reduced pressure, for example all around the detection chamber 61 or over a part of its periphery.

As indicated above, the zone under test may be a junction zone between a plurality of metal plates, for example four rectangular metal plates, corrugated or not. Such use of the detection dome 55 will now be described with reference to FIGS. 18 to 20.

Where a junction zone between a plurality of plane rectangular plates is concerned, reference may be had for example to the publication EP-A-0064886. The publication U.S. Pat. No. 4,021,982 illustrates in FIG. 24 a junction zone between a plurality of corrugated rectangular plates. In these examples as in that from FIG. 18 each of the four rectangular metal plates 31 includes a cutaway corner 32, for example forming an angle of 45° with the edges of the plate. The four cutaway corners 32 are moved toward one another so as to overlap on a metal insert 33 fixed to the insulating body and a central zone of which, here of square shape, remains exposed between the four cutaway corners 32. This central zone of the metal insert 33 forms a part of the sealed membrane thanks to the sealed weld lines produced along the cutaway corners 32.

The dashed lines 34 represent offsetting curvatures in the direction of thickness of the rectangular metal plates 31 that enable the mutual overlaps, in accordance with the known technique.

Figure 18:
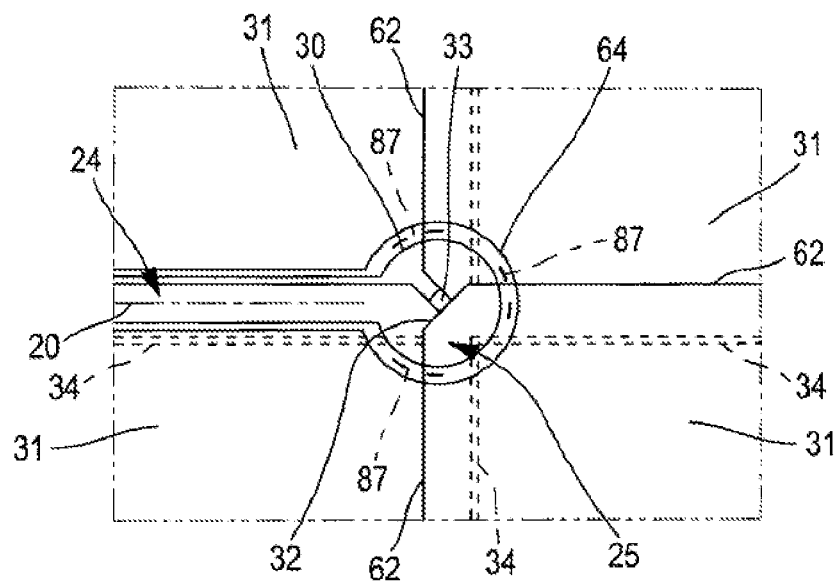
FIG. 18 is a view from above of a sealing membrane schematically illustrating a detection dome positioned to test a junction between four rectangular plates.

In FIG. 18 the detection dome has a shape corresponding to the embodiment from FIG. 13. The position of the detection dome has been sketched by representing the contour of the sealing lip 64 and the contour 30 of the detection chamber 61, part of which is represented. In particular, the circular zone 25 of the detection chamber 61 is positioned in line with the aforementioned junction zone, for example centered over the exposed part of the metal insert 33, while the central rectilinear band 24 of the detection chamber 61 is positioned over a rectilinear edge of one of the rectangular metal plates 31. The circular zone 25 of the detection chamber 61 has a diameter adapted to encircle completely the four cutaway corners 32 in line with the aforementioned junction zone. To this end its diameter is for example greater than 68 mm for a Mark III® type corrugated membrane.

In FIG. 18, the end pressure elements 87 have been sketched in dashed outline. It can therefore be noted that the end pressure elements 87 have been positioned on the detection dome in such a manner that, when the detection dome is placed at this location, the end pressure elements 87 are in fact in line with the weld beads 62 that join the rectangular metal plates 31 together along the edges. The end pressure elements 87 therefore press on the portions of the peripheral sealing lip 64 that rest on those weld beads 62, which necessarily have some relief. The end pressure elements 87 positioned in this way make it possible to obtain a perfectly sealed contact despite this relief. In particular, it is seen in FIG. 18 that three end pressure elements 87 press on three portions of the peripheral sealing lip 64 that respectively cross three weld beads 62 in this junction zone.

The end pressure elements 87 illustrated in FIG. 18 preferably have a rectilinear or curvilinear elongate shape. They may in particular be produced in the form of elongate bearing elements 91 as in FIG. 16 or with a distribution sole plate 95 as in FIG. 17.

Other geometries of the detection dome may be envisaged for this use. In the embodiment from FIG. 19 the detection dome has a modified shape in which the circular zone 25 constitutes a central portion of the detection chamber 61 and the detection chamber 61 has two elongate zones 24 extending from the circular zone 25 in a diametrically opposite manner to one another along the median longitudinal axis 20. In the embodiment from FIG. 20 the detection dome has a modified shape in which the detection chamber 61 has a circular shape.

Figure 19:
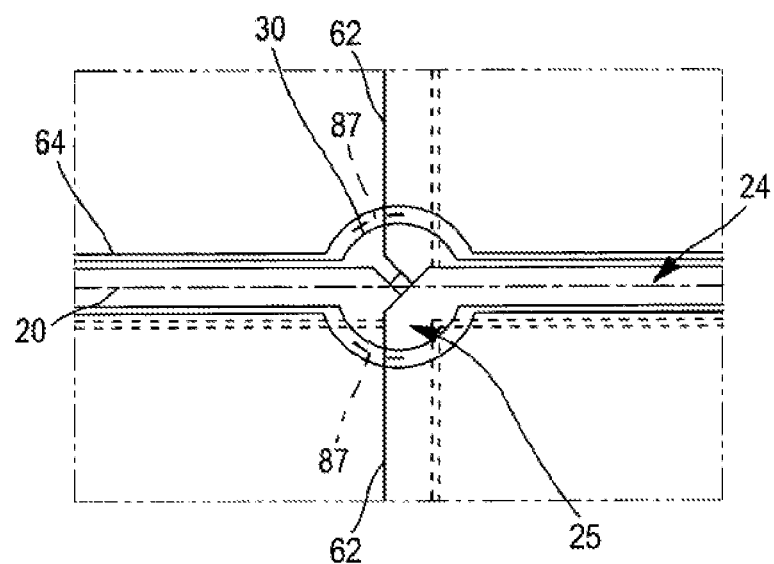
FIG. 19 is a view analogous to FIG. 18 illustrating another geometry of the detection dome positioned to test a junction between four rectangular plates.
Figure 20:
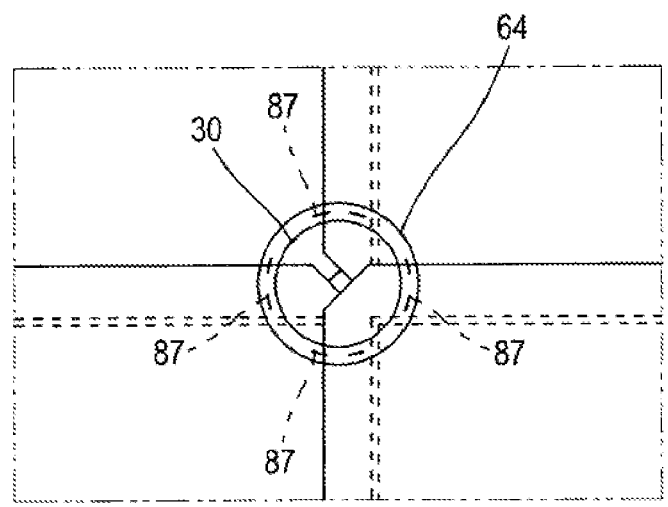
FIG. 20 is a view analogous to FIG. 18 illustrating a further geometry of the detection dome positioned to test a junction between four rectangular plates.

In the case of FIG. 19 it is seen that two end pressure elements 87 press on two portions of the peripheral sealing lip 64 that respectively cross two weld beads 62 in this junction zone at diametrically opposite locations around the circular zone 25. In the case of FIG. 20 it is seen that four end pressure elements 87 press on four portions of the peripheral sealing lip 64 that respectively cross four weld beads 62 in this junction zone.

Alternatively a convex polygonal shape may be employed in place of the circular zone 25, in which case a circle geometrically inscribed in the shape of the detection chamber must have a diameter adapted to encircle completely the four cutaway corners 32 in line with the aforementioned junction zone.

An embodiment of the leak detection device 54 in which the detection dome 55 in accordance with the fourth embodiment may be employed will now be described with reference to FIGS. 22 to 25.

The leak detection device 54 includes the detection dome 55, the analysis tool 56 with its associated vacuum pump 57, where applicable a higher power second vacuum pump 37, and an aspiration circuit connecting the detection chamber 61 to the analysis tool 56 via a solenoid valve 48. The aspiration circuit preferably includes a hose 58 of relatively great length to favor the mobility of the detection dome 55 over a relatively extensive working zone around the analysis tool 56. This hose 58 is for example connected by connectors 39 on the one hand to an outlet of the detection chamber 61 and on the other hand to the analysis tool 56. When a second vacuum pump 37 is employed a branch connector 38 may be provided to connect the analysis tool 56 and the second vacuum pump 37 in parallel.

A control unit 36 is also provided to control the solenoid valve 48, and where applicable other elements such as the analysis tool 56, in response to actions of an operative on one or more control members of the detection dome 55, disposed for example on one or more handling handles 76 of the detection dome 55.

For example, in the case of the detection dome 55 in accordance with the fourth embodiment, each of the two handling handles 76 is equipped with a pushbutton that can be actuated with the thumb and respectively configured as an activation button 51 and a deactivation button 52. Control members of a form other than a pushbutton may be envisaged instead, for example a capacitive touch-sensitive button, a pivoting lever, or any other member that can be actuated manually.

In a preferred operating mode the vacuum pump 37 or other source of reduced pressure is activated beforehand and permanently generates a reduced pressure in the suction circuit. The solenoid valve 48 is closed by default, with the result that the detection chamber 61 is not initially subjected to the reduced pressure, which enables free movement of the detection dome 55 over the membrane 5, 8.

Figure 23:
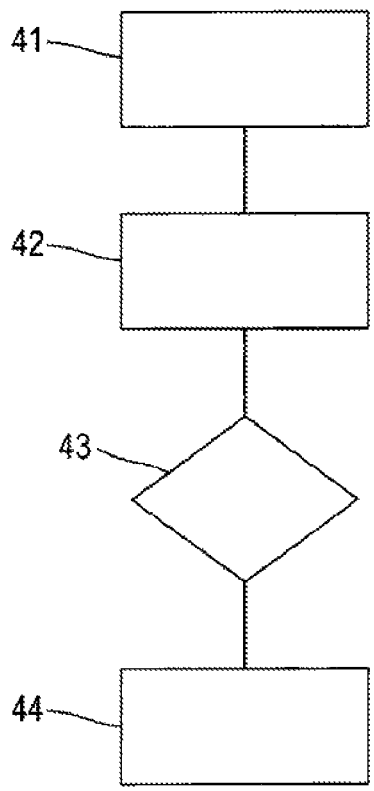
FIG. 23 is a diagram illustrating an activation method that may be used in the leak detection device from FIG. 22.
Figure 24:
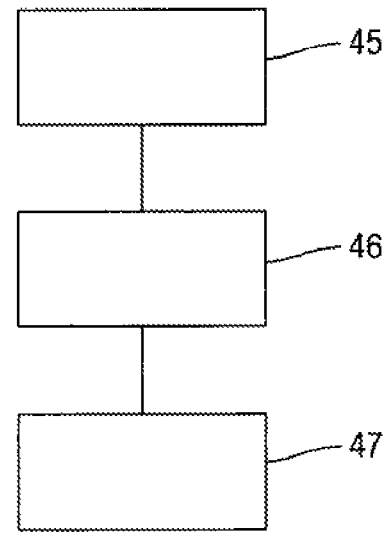
FIG. 24 is a diagram illustrating a deactivation method that may be used in the leak detection device from FIG. 22.

Starting from this state, the control methods illustrated in FIGS. 23 and 24 may be implemented by the control unit 36:

In step 41, an activation control signal emitted by the activation button 51 is detected.

In step 42, the solenoid valve 48 is switched into an open state to connect the detection chamber 61 to the vacuum pump 37. That state may be indicated by turning on an indicator lamp 96 on the detection dome 55, for example a red LED, for example on the handling handle 76 as illustrated in FIG. 15.

This produces aspiration into the detection chamber 61. If the detection dome 55 is correctly positioned on the membrane with the sealing lip 24 in sealed contact with the membrane 5, 8 all around the detection chamber 61, the reduced pressure is established and firmly presses the detection dome 55 against the membrane 5, 8, crushing the sealing lip 24. The gas coming from the detection chamber 61 can then be analyzed as explained above.

In step 45 a deactivation control signal emitted by the deactivation button 52 is detected.

In step 46 the solenoid valve 48 is switched into a closed state to isolate the detection chamber 61 from the vacuum pump 37. The reduced pressure in the detection chamber 61 is no longer maintained, which allows the pressure to rise. However, in the absence of a severe leak, this rise in pressure may be very slow.

In step 47 a vent is therefore preferably opened to place the detection chamber 61 in communication with the surrounding atmosphere, which enables immediate release of the detection dome 55 from the membrane 5, 8.

Figure 22:
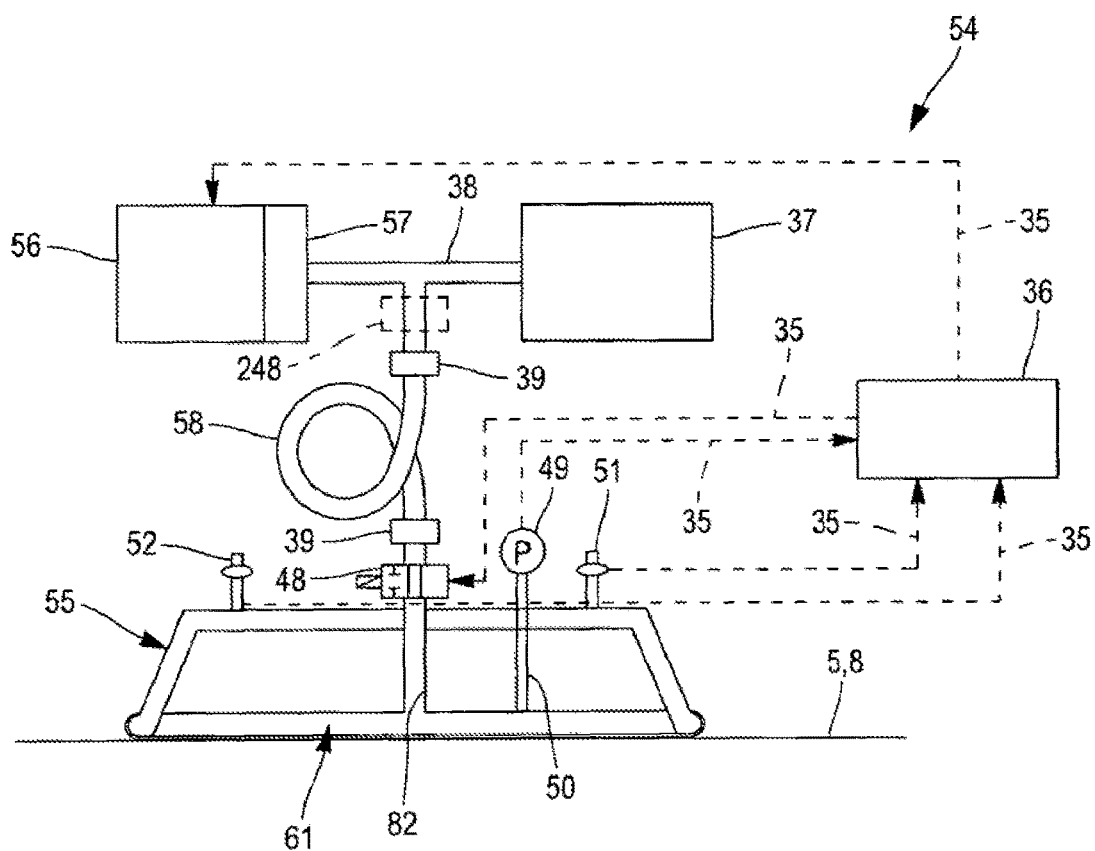
FIG. 22 is a schematic functional view of a leak detection device employing the leak detection dome from FIG. 13.
Figure 25:
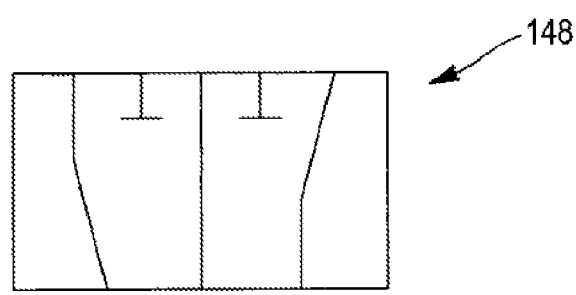
FIG. 25 is a schematic functional diagram of a three-port valve that may be employed in the leak detection device from FIG. 22.

In one embodiment steps 46 and 47 are effected simultaneously by switching a three-port valve 148 schematically represented in FIG. 25 that is used in place of the solenoid valve 48 from FIG. 22.

The solenoid valve 48 may be positioned at the gas outlet 78 of the detection dome 55, as illustrated in FIG. 22. It may also be positioned at some other location in the aspiration circuit, for example at the level of the branch connector 38 as indicated by the reference number 248.

The control signals between the control unit 36, the solenoid valve 48, the activation button 51 and the deactivation button 52 are conveyed by wired or wireless communication links 35, for example taking the form of a flexible electrical cable or braided flexible cables to favor the mobility of the detection dome 55.

In one embodiment the control unit 36 is also configured to control the analysis tool 56. To this end a wired or wireless communication link 35 is also provided between the control unit 36 and the analysis tool 56. Moreover, a pressure sensor 49 also connected to the control unit 36 is provided on the detection dome 55 to measure the pressure in the detection chamber 61 after step 42.

In this case the control method as carried out following the activation control signal continues in the following manner:

In step 43 the pressure indicated by the measurement signal from the pressure sensor 49 is compared to a predefined pressure threshold to enable the analysis tool 56 to function. If the measured pressure is below that threshold step 44 is effected. That state may be signaled by turning on another indicator light on the detection dome 55, for example a green LED, for example on the handling handle 76 as indicated by the reference number 97 in FIG. 15.

In step 44 the analysis tool 56 is activated to carry out an analysis cycle enabling detection of a leakage flow, as explained above.

In the case of the detection dome in accordance with the fourth embodiment illustrated in FIG. 13 or 21, two channels 82 and 50 pass through the main body to connect the detection chamber 61 to two gas outlets 78 and 50. The pressure sensor 49 may be placed on the detection dome 55 and connected to the gas outlet 50, as illustrated in FIG. 22. The pressure sensor 49 could also be arranged at some other position.

Thanks to the control methods described hereinabove, and in particular using the detection dome in accordance with the fourth embodiment, the leak detection device 54 is particularly easy and quick to use.

The source of reduced pressure being activated beforehand, the operative grasps the detection dome 55 by the two handles and positions the detection dome 55 on the chosen test zone, where applicable with the aid of the sighting devices described above.

The operative then presses the activation button 51. The method from FIG. 23 is then executed until a measurement is obtained by the analysis tool 56 representative of the leakage flow.

The operative then has only to press the deactivation button 52 to position the detection dome 55 on another test zone. The detection dome 55 can therefore be employed without the operative having to interact with the vacuum pump 37, the control unit 36 or the analysis tool 56 throughout a working zone defined by the length of the fluidic and electric connections of the detection dome 55 with those elements. To favor the mobility of the leak detection device 54 on a larger scale the vacuum pump 37, the control unit 36 and the analysis tool 56 may be mounted on a rolling carriage, not illustrated.

In another embodiment, not represented, the various features of the previous embodiments are combinable with one another. In fact, the mechanical pressure means 66 from FIG. 8 can for example be adapted to a seal 60 from FIG. 5 by modifying the arrangement of the curved blades 72.

The detection dome, the detection device and the method of using this device all described above are aimed more particularly at testing the seal of a membrane of a sealed and thermally insulating membrane tank. For example, membrane tanks of this kind are described in particular in the patent applications WO14057221, FR2691520.

Figure 11:
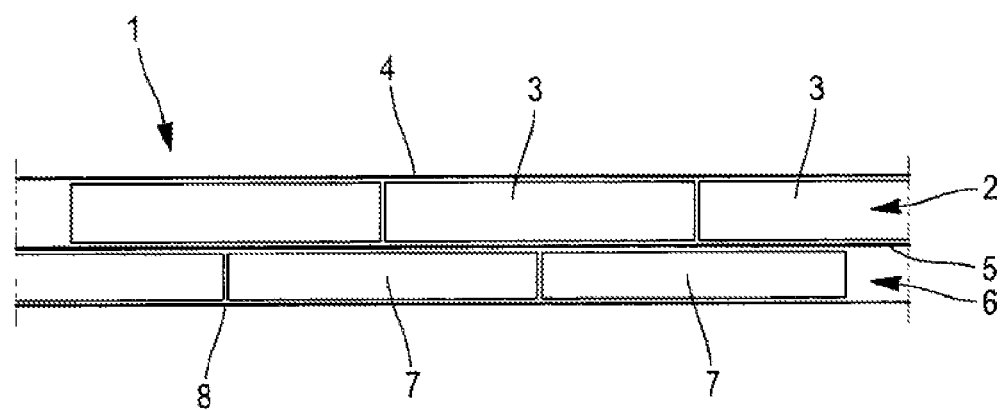
FIG. 11 is a schematic illustration of a multilayer structure of a wall of a membrane tank.

Membrane tanks have a plurality of walls that have a multilayer structure, as represented in FIG. 11. Each wall 1 includes, from the exterior toward the interior of the tank, a secondary thermally insulating barrier 2 including secondary insulating panels 3 anchored to a support structure 4, a secondary membrane 5 resting against the secondary thermally insulating barrier 2, a primary thermally insulating barrier 6 including primary insulating panels 7 resting against the secondary membrane 2 and anchored to the support structure 4 or to the secondary insulating panel 3, and a primary membrane 8 that rests against the primary thermally insulating barrier 6 and is intended to be in contact with the liquefied gas contained in the tank.

The tank has a polyhedral general shape. In the embodiment illustrated in FIG. 12 the tank has a front wall 9 and a rear wall, not represented, which here are of octagonal shape. The tank also includes a ceiling wall 10, a bottom wall 11 and lateral walls 11, 12, 13, 14, 15, 16, 17 that extend in the longitudinal direction of the tank between the front wall 9 and the rear wall.

The secondary thermally insulating barriers 2 of the tank walls communicate with one another in such a manner as to form between the support structure 4 and the secondary membrane 5 a secondary sealed thermally insulating space. Likewise, the primary thermally insulating barrier 6 of the tank walls communicate with one another in such a manner as to form between the secondary membrane 5 and the primary membrane 8 a primary sealed thermally insulating space.

The primary membrane 8 and/or the secondary membrane 5 include(s) a plurality of metal plates that are welded to one another. The seal test method that will be described hereinafter is aimed more particularly at testing the seal of the welds for connecting the metal plates to one another. In accordance with one embodiment the membrane under test has corrugations that enable it to deform because of the effect of thermal and mechanical loads generated by the fluid stored in the tank. To this end, as represented for example in FIG. 8, each metal plate includes two mutually perpendicular series of corrugations.

In one embodiment the seal test method includes three steps, namely:

diffusing a tracer gas into a thermally insulating space covered by the membrane 5, 8 the seal of which it is required to test;

monitoring the diffusion of the tracer gas into the thermally insulating space; and verifying the seal of the welds of the membrane 5, 8.

In another embodiment the seal test method includes only verification of the seal of the welds of the membrane 5, 8 without using a tracer gas.

The step of diffusing a tracer gas consists in injecting a tracer gas into the thermally insulating space that is covered by the membrane 5, 8 the seal of which it is required to verify. When it is required to verify the seal of the secondary membrane 5, the tracer gas is injected into the secondary thermally insulating space. In this case the seal test method is carried out before the primary thermally insulating barrier 7 and the primary membrane 8 are installed. When it is required to verify the seal of the primary membrane 8, the tracer gas is injected into the primary thermally insulating space.

Figure 12:
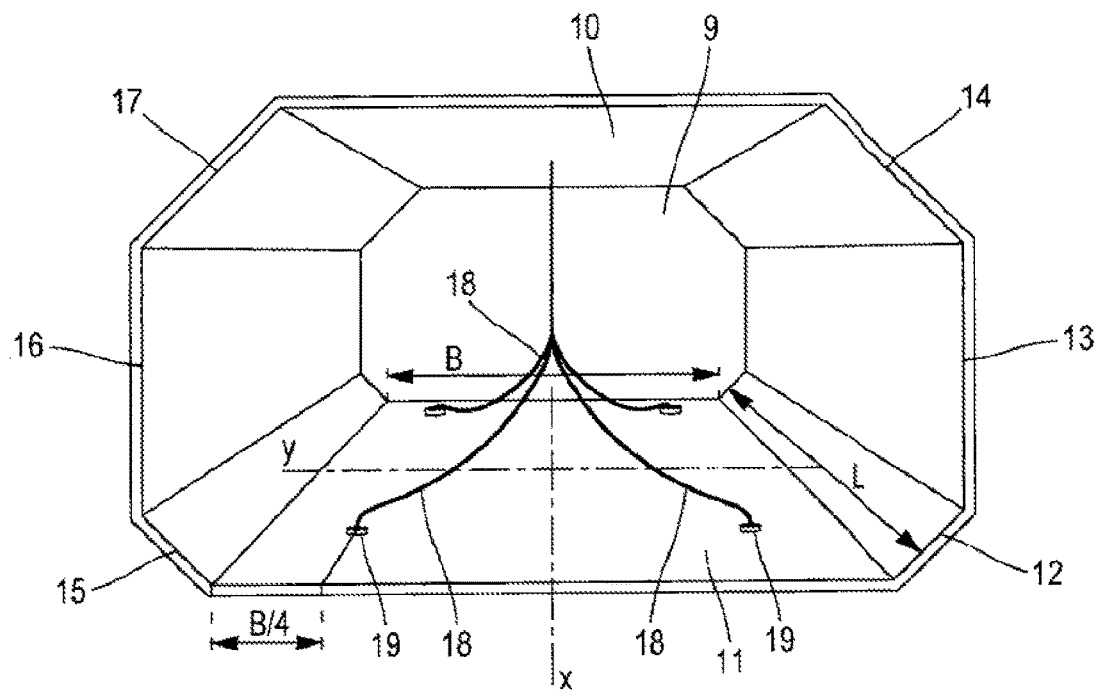
FIG. 12 is a schematic partial view of a sealed and thermally insulating tank illustrating tracer gas injection devices positioned through a membrane of the bottom wall of the tank.

FIG. 12 illustrates schematically a sealed and thermally insulating tank and a system for injecting the tracer gas into a thermally insulating space.

The injection system includes a plurality of pipes 18 which are on the one hand connected to a source of tracer gas, not illustrated, and on the other hand connected to devices for injecting the tracer gas 19 forming a tracer gas injection passage through the membrane 5, 8 the seal of which has to be tested. The tracer gas injection devices 19 more particularly produce tracer gas passages through the membrane of the bottom wall 11. This kind of disposition is particularly advantageous because the tracer gas has a vapor density lower than that of air with the result that it tends to rise in the thermally insulating space. Injecting the tracer gas from the bottom, through the membrane 5, 8 to be tested of the bottom wall 11, then enables rapid and homogeneous diffusion of the tracer gas into the thermally insulating space.

In the embodiment represented in FIG. 12 the bottom wall 11 is equipped with at least four tracer gas injection devices 19 that are regularly distributed over the surface of the bottom wall 11. The bottom wall 11 has a rectangular shape and may therefore be divided into four equal area zones by its two axes of symmetry x and y. Each of the four tracer gas injection devices 19 is disposed in one of the aforementioned four zones. In the particular embodiment illustrated each tracer gas injection device 19 is disposed near the center of its respective zone. In one particular embodiment each of the four tracer gas injection devices is disposed at a distance ¼ L from the adjacent longitudinal edge and at a distance ¼ B from the adjacent transverse edge, where L is the longitudinal dimension of the bottom wall 11 and B is the transverse dimension of the bottom wall 11.

The step of monitoring diffusion of the tracer gas consists in monitoring diffusion of the tracer gas into the thermally insulating space when the tracer gas has diffused across the thermally insulating space.

To this end, the gas contained in the thermally insulating space into which the tracer gas has been injected is sampled by means of a plurality of gas sampling devices formed through the membrane covering said thermally insulating space. Each sampling device is connected to an analysis tool, such as a mass spectrometer, which makes it possible to verify the presence and the concentration of the tracer gas in the corresponding zone of the thermally insulating space.

The step of verifying the welds consists in using the leak detection device 54 described above on one of the membranes 5, 8 of the sealed and thermally insulating tank.

Although the invention has been described in connection with a plurality of particular embodiments, it is obvious that it is in no way limited to them and that it is encompasses all technical equivalents of the means described and combinations thereof if the latter fall within the scope of the invention.

Use of the verb "include" or "comprise" and its conjugate forms does not exclude the presence of elements or steps other than those stated in a claim.

In the claims, no reference sign in parentheses should be interpreted as a limitation of the claim.

The invention claimed is:

1. A leak detection device (54) for detecting a leak in a test zone (62) of a sealing membrane (5, 8) of a sealed and thermally insulating tank, the leak detection device (54) including:
   a leak detection dome (55) including a main body (100) intended to be disposed on the test zone (62) and a seal (60) connected to the main body (100) and configured to define a detection chamber (61) between the main body (100) and the test zone (62), the seal (60) including a peripheral sealing lip (64) configured to come into contact with the sealing membrane and having a closed contour encircling the detection chamber (61),
   a vacuum pump (57) connected to the detection chamber (61) to generate a reduced pressure in the detection chamber (61), and
   an analysis tool (56) connected to the detection chamber (61) to analyze a gas present in the detection chamber (61),
   in which the sealing lip (64) is configured to occupy two positions, namely a first position in an initial state, without application of a vacuum in the detection chamber (61), and a second position in a service state, with application of a vacuum in the detection chamber (61) to perform a depression in the detection chamber (61), the sealing lip (64) comprising only in the second position relative to the service state a pinch portion (53) that is pinched between the main body (100) and the sealing membrane (5, 8) over at least a part of the periphery of the detection chamber (61), the sealing lip (64) having a flexibility allowing the formation of said pinch portion (53) by deformation of the sealing lip (64) towards the detection chamber (61) under the effect of the depression in the detection chamber (61).

2. The device as claimed in claim 1, in which the sealing lip (64) is configured to have, at least in a service state in which a reduced pressure is applied in the detection chamber (61), a pinch portion (53) that is pinched between the main body (100) and the sealing membrane (5, 8) over all of the periphery of the detection chamber (61).

3. The device as claimed in claim 1, in which the detection chamber (61) of the leak detection dome (55) has a convex zone (25) intended to cover a junction zone between four corrugated or plane metal plates (31).

4. The device as claimed in claim 3, in which the convex zone (25) has a diameter greater than 68 mm, the diameter of the convex zone (25) being defined by a circle geometrically inscribed in the convex zone (25).

5. The device as claimed in claim 3, in which the detection dome has an elongate shape along a longitudinal axis, the detection chamber (61) of the leak detection dome (55) including an elongate zone (24) intended to cover a rectilinear edge of a metal plate, the convex zone (25) being disposed at one end of the elongate zone.

6. The device as claimed in claim 5, in which the convex zone is a first convex zone (25) and the detection chamber (61) of the leak detection dome (55) includes a second convex zone disposed at an end of the elongate zone opposite the first convex zone (25) along the longitudinal axis.

7. The device as claimed in claim 3, in which the detection dome has an elongate shape along a longitudinal axis, the convex zone (25) constituting a central portion of the detection chamber (61) of the leak detection dome (55), the detection chamber (61) including two elongate zones (24) extending from the convex zone away from one another along the longitudinal axis.

8. The device as claimed in claim 3, in which the detection chamber (61) has a convex polygonal or circular cross-sectional shape.

9. The device as claimed in claim 8, in which the shape of the detection chamber has a diameter greater than 68 mm, the diameter of the shape of the detection chamber being defined by a circle geometrically inscribed in the shape of the detection chamber.

10. A method of using a leak detection device (54) as claimed in claim 5 in a test zone (62) including a junction zone between four corrugated or plane metal plates (31) of a tank sealing membrane (5, 8), the method including the steps of:
    placing the leak detection dome (55) in the test zone (62) in such a manner that the sealing lip (64) comes into contact with the sealing membrane all around the test zone (62) and the convex zone (25) covers said junction zone,
    generating a reduced pressure in the detection chamber (61) by means of the vacuum pump (57),
    pinching the pinch portion of the sealing lip (64) between the main body (100) and the sealing membrane (5, 8) over at least a part of the periphery of the detection chamber (61),
    conveying the gases present in the detection chamber (61) toward the analysis tool (56), and
    analyzing by means of the analysis tool (56) the gases coming from the detection chamber (61) to produce a measurement signal representing a quantity of at least one gas present in the detection chamber (61).

11. The device as claimed in claim 1, in which the leak detection dome (55) includes a mechanical pressure means (66) carried by the main body (100) and including at least one pressure element (72) configured to exert on a portion of the sealing lip (64) a pressure directed toward the membrane (5, 8) when the main body (100) is disposed in the test zone (62).

12. The device as claimed in claim 1, in which the analysis tool (56) is configured to detect a tracer gas.

13. The device as claimed in claim 1, in which the analysis tool (56) is configured to detect a component of the surrounding air.

14. A leak detection method for detecting a leak in a test zone of a sealing membrane of a tank with the aid of a leak detection dome, the leak detection dome including a main body and a seal connected to the main body and configured to define a detection chamber between the main body and the sealing membrane, the seal including a peripheral sealing lip configured to come into contact with the sealing membrane and having a closed contour encircling the detection chamber, the leak detection dome further including a mechanical pressure means carried by the main body and including at least one pressure element configured to exert on a portion of the sealing lip a pressure directed toward the membrane when the main body is disposed in the test zone, the detection dome comprising a support element (73) fixed to the main body (100), the pressure element comprising a body (89) fixed to the support element (73), a rod (90) mounted to be mobile in translation relative to the body (89), a spring (86) urging the rod (90) towards the sealing lip (64) and a bearing element (91) fixed to one end of the rod (90) and coming to bear against the sealing lip (64) under the effect of the spring (86), said sealing membrane including a plurality of corrugated or plane metal plates that are welded to one another, the leak detection method including the following steps:

disposing the detection dome against the sealing membrane so as to position the detection chamber in line with at least one weld bead between a first metal plate and a second metal plate and positioning the pressure element to exert the pressure on a portion of the sealing lip that crosses said weld bead, reducing the pressure in the detection chamber by means of a vacuum pump, conveying the gas phase contained in the detection chamber to an analysis tool to detect a gas present in the detection chamber.

15. The method as claimed in claim 14, in which the detection chamber (61) of the leak detection dome (55) includes a convex zone (25), said pressure element for exerting the pressure on the portion of the sealing lip that crosses said weld bead being disposed at the periphery of the convex zone (25).

16. The method as claimed in claim 15, in which the weld bead between the first metal plate and the second metal plate is a first weld bead and the pressure element is a first pressure element, and in which the convex zone (25) of the detection chamber is also placed in line with a second weld bead joining the first or second metal plate (31) with a third metal plate, the mechanical pressure means further including a second pressure element positioned to exert the pressure on a portion of the sealing lip that crosses said second weld bead.

17. The method as claimed in claim 16, in which the metal plates are substantially rectangular and the detection chamber is placed in line with a junction zone between the first, second, third metal plates and a fourth metal plate, the junction zone further including a third weld bead joining the first or second metal plate (31) with the fourth metal plate, the mechanical pressure means further including a third pressure element positioned to exert the pressure on a portion of the sealing lip that crosses said third weld bead.

18. The method as claimed in claim 15, in which the detection dome has an elongate shape along a longitudinal axis, the detection chamber (61) of the leak detection dome (55) including an elongate zone (24) intended to cover a rectilinear edge of a metal plate, the convex zone (25) being disposed at one end of the elongate zone.

19. The method as claimed in claim 14, in which the rod is a first rod (90), and the pressure element includes a second rod (90) mounted to be mobile in translation relative to the main body (100), the first rod and the second rod (90) being at a distance from one another, springs (86) urging said rods (90) toward the sealing lip (64), and the bearing element being an elongate bearing element (91) having a first end fixed to one end of the first rod (90) and a second end fixed to one end of the second rod (90), said elongate bearing element (91) coming to bear against the sealing lip (64) because of the effect of the springs.

20. The method as claimed in claim 14, in which the pressure element (87) includes a plurality of adjustment elements (92) mounted on the main body (100) and forming a line, an adjustment element (92) including an adjustment rod (93) extending perpendicularly in the direction of the sealing lip (64), the adjustment rod (93) having an end (94) the position of which is adjustable in a longitudinal direction of the rod so as to come into contact with the sealing lip.

21. The method as claimed in claim 20, in which the pressure element (87) further includes a distribution sole plate (95) arranged between the ends (94) of the adjustment rods (93) and the sealing lip (64).

* * * * *